United States Patent
Pradeep

(10) Patent No.: US 11,429,807 B2
(45) Date of Patent: Aug. 30, 2022

(54) AUTOMATED COLLECTION OF MACHINE LEARNING TRAINING DATA

(71) Applicant: MICROSOFT TECHNOLOGY LICENSING, LLC, Redmond, WA (US)

(72) Inventor: Vivek Pradeep, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1245 days.

(21) Appl. No.: 15/870,783

(22) Filed: Jan. 12, 2018

(65) Prior Publication Data

US 2019/0220698 A1    Jul. 18, 2019

(51) Int. Cl.

| | | |
|---|---|---|
| *G06N 20/00* | (2019.01) | |
| *G06K 9/62* | (2022.01) | |
| *G06V 40/70* | (2022.01) | |
| *G06T 7/254* | (2017.01) | |
| *G06T 7/73* | (2017.01) | |
| *G10L 15/06* | (2013.01) | |

(52) U.S. Cl.
CPC ......... *G06K 9/6256* (2013.01); *G06K 9/6293* (2013.01); *G06N 20/00* (2019.01); *G06T 7/254* (2017.01); *G06T 7/75* (2017.01); *G06V 40/70* (2022.01); *G10L 15/063* (2013.01); G10L 2015/0636 (2013.01)

(58) Field of Classification Search
CPC .... G06K 9/6256; G06K 9/6293; G06N 20/00; G06T 7/254; G06T 7/75; G06V 40/70; G10L 15/063; G10L 2015/0636
USPC .......................................................... 706/12
See application file for complete search history.

(56) References Cited

U.S. PATENT DOCUMENTS

| | | | |
|---|---|---|---|
| 7,151,801 | B2 | 12/2006 | Grossberg et al. |
| 9,087,402 | B2 | 7/2015 | Doolittle |
| 9,626,766 | B2 | 4/2017 | Criminisi et al. |
| 10,535,138 | B2 | 1/2020 | Pfeiffer |
| 2007/0103595 | A1 | 5/2007 | Gong et al. |

(Continued)

FOREIGN PATENT DOCUMENTS

EP    3232371 A1    10/2017

OTHER PUBLICATIONS

Patterson, Steven Max, "Google focuses on a future of even better mobile cameras", Retrieved From «https://www.networkworld.com/article/3193383/mobile-wireless/google-focuses-on-a-future-of-even-better-mobile-cameras.html», May 1, 2017, 6 Pages.

(Continued)

*Primary Examiner* — Charlotte M Baker
(74) *Attorney, Agent, or Firm* — NovoTechIP International PLLC

(57) ABSTRACT

Methods and systems for automatically generating training data for use in machine learning are disclosed. The methods can involve the use of environmental data derived from first and second environmental sensors for a single event. The environmental data types derived from each environmental sensor are different. The event is detected based on first environmental data derived from the first environmental sensor, and a portion of second environmental data derived from the second environmental sensor is selected to generate training data for the detected event. The resulting training data can be employed to train machine learning models.

19 Claims, 16 Drawing Sheets

(56) References Cited

U.S. PATENT DOCUMENTS

| | | |
|---|---|---|
| 2013/0159223 A1 | 6/2013 | Bahl et al. |
| 2013/0346346 A1 | 12/2013 | Criminisi et al. |
| 2014/0122381 A1 | 5/2014 | Nowozin |
| 2014/0172753 A1 | 6/2014 | Nowozin |
| 2015/0058004 A1 | 2/2015 | Dimitriadis et al. |
| 2015/0160785 A1 | 6/2015 | Wang et al. |
| 2015/0248764 A1 | 9/2015 | Keskin et al. |
| 2015/0248765 A1 | 9/2015 | Criminisi et al. |
| 2017/0132496 A1 | 5/2017 | Shoaib et al. |
| 2017/0185871 A1 | 6/2017 | Zhang et al. |
| 2017/0206431 A1 | 7/2017 | Sun et al. |
| 2017/0236286 A1 | 8/2017 | Fanello et al. |
| 2017/0262768 A1 | 9/2017 | Nowozin et al. |
| 2018/0306609 A1* | 10/2018 | Agarwal ................. H04L 67/12 |
| 2019/0220697 A1 | 7/2019 | Kiemele et al. |

OTHER PUBLICATIONS

Romano, et al., "RAISR: Rapid and Accurate Image Super Resolution", In Journal of IEEE Transactions on Computational Imaging, vol. 3, Issue 1, Mar. 2017, pp. 1-31.

Rushdi, et al., "Augmented Coupled Dictionary Learning for Image Super-Resolution", In Journal of 11th International Conference on Machine Learning and Applications, Dec. 12, 2012, pp. 262-267.

Wilson, Andy, "Machine learning leverages image classification techniques", Retrieved From «http://www.vision-systems.com/articles/print/volume-20/issue-2/features/machine-learning-leverages-image-classification-techniques.html», Feb. 4, 2015, 5 Pages.

"Non Final Office Action Issued in U.S. Appl. No. 15/870,795", dated Feb. 22, 2022, 13 Pages.

Brukner, et al., "Hierarchical Semantic Processing Architecture for Smart Sensors in Surveillance Networks", In the Proceedings of IEEE Transactions on Industrial Informatics, vol. 8, No. 2, May 1, 2012, 11 Pages.

Kim, et al., "Generation of ROI Enhanced Depth Maps Using Stereoscopic Cameras and a Depth Camera", In the Proceedings of IEEE Transactions on Broadcasting, vol. 54, No. 4, Dec. 1, 2008, 9 Pages.

Mesmakhosroshaki, et al., "Stereo based region of interest generation for pedestrian detection in driver assistance systems", In the Proceedings of IEEE International Conference on Image Processing, Sep. 1, 2013, 4 Pages.

"International Search Report & Written Opinion Issued in PCT Patent Application No. PCT/US18/066626", dated Mar. 13, 2019, 14 Pages.

"International Search Report & Written Opinion Issued in PCT Patent Application No. PCT/US18/066627", dated Mar. 22, 2019, 16 Pages.

Waehner, Kai, "How to Build and Deploy Scalable Machine Learning in Production with Apache Kafka", Retrieved From: https://www.confluent.io/blog/build-deploy-scalable-machine-learning-production-apache-kafka/, Sep. 29, 2017, 8 Pages.

"Notice of Allowance Issued in U.S. Appl. No. 15/870,795", dated Jun. 29, 2022, 8 Pages.

"Office Action Issued in Indian Patent Application No. 202047025181", dated Jun. 27, 2022, 7 Pages.

* cited by examiner

AUTOMATED COLLECTION OF MACHINE LEARNING TRAINING DATA

BACKGROUND

Machine learning (ML) technologies have offered significant improvements in recognizing the occurrence of events from a wide variety of data sources. In order for supervised learning techniques to train generalized ML models that are effective in real-world applications, a significant amount of training data encompassing a wide range of situations is often required. For a number of common applications of ML models, there are large publicly available labeled training datasets that have fueled advancements in ML algorithms and supervised training of associated ML models. For example, for detecting and classifying objects in static RGB images, there is the Common Objects in Context (COCO) dataset and the ImageNet dataset; and for facial feature recognition, there is the UMDFaces dataset. Such datasets are the result of major curation efforts and many man hours of manual labeling of training data items.

However, for narrower and/or novel applications of ML algorithms and supervised training of associated ML models, it is a major effort and challenge to identify, select, and annotate a sufficiently large and varied dataset that can produce sufficiently generalized ML models. For example, even where a substantial effort is made to generate a new large dataset, the resulting dataset may still fail to capture the varied situations encountered in real-world applications. This difficulty in obtaining large and varied datasets impedes the advancement of novel applications of ML technologies. New and improved approaches for developing new training datasets useful for specific novel ML applications are desirable.

SUMMARY

A training data collection device is disclosed. The training data collection device includes a first environmental sensor, as well as a machine readable medium including instructions which, when executed by the training data collection device, cause the training data collection device to receive first training event detection data for identifying events of a first event type based on at least environmental data of a first environmental data type; based on the received first training event detection data, configure a training event detector included in the device to identify events of the first event type based on at least environmental data of the first environmental data type; obtain first environmental data of the first environmental data type based at least on a first measurement performed by the first environmental sensor at a first time; obtain second environmental data of a second environmental data type based on at least one or more measurements performed by a second environmental sensor, wherein the second environmental data type is different than the first environmental data type; automatically determine, based on at least applying the configured training event detector to the first environmental data, that a first event occurred at about the first time; automatically select a first subportion of the second environmental data based on at least the first subportion of the second environmental data corresponding to the first measurement performed by the first environmental sensor; and generate training data based on at least the selected first subportion of the second environmental data.

In another implementation, a method is disclosed, where the method includes receiving, at a first computing device including a first environmental sensor, first training event detection data for identifying events of a first event type based on at least environmental data of a first environmental data type; based on the received first training event detection data, configuring a training event detector included in the first computing device to identify events of the first event type based on at least environmental data of the first environmental data type; obtaining first environmental data of the first environmental data type based at least on a first measurement performed by the first environmental sensor at a first location at a first time; obtaining second environmental data of a second environmental data type based on at least one or more measurements performed by a second environmental sensor at the first location, wherein the second environmental data type is different than the first environmental data type; automatically determining, based on at least applying the configured training event detector to the first environmental data, that a first event occurred at about the first time; automatically selecting a first subportion of the second environmental data based on at least the first subportion of the second environmental data corresponding to the first measurement performed by the first environmental sensor; and generating training data based on at least the selected first subportion of the second environmental data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
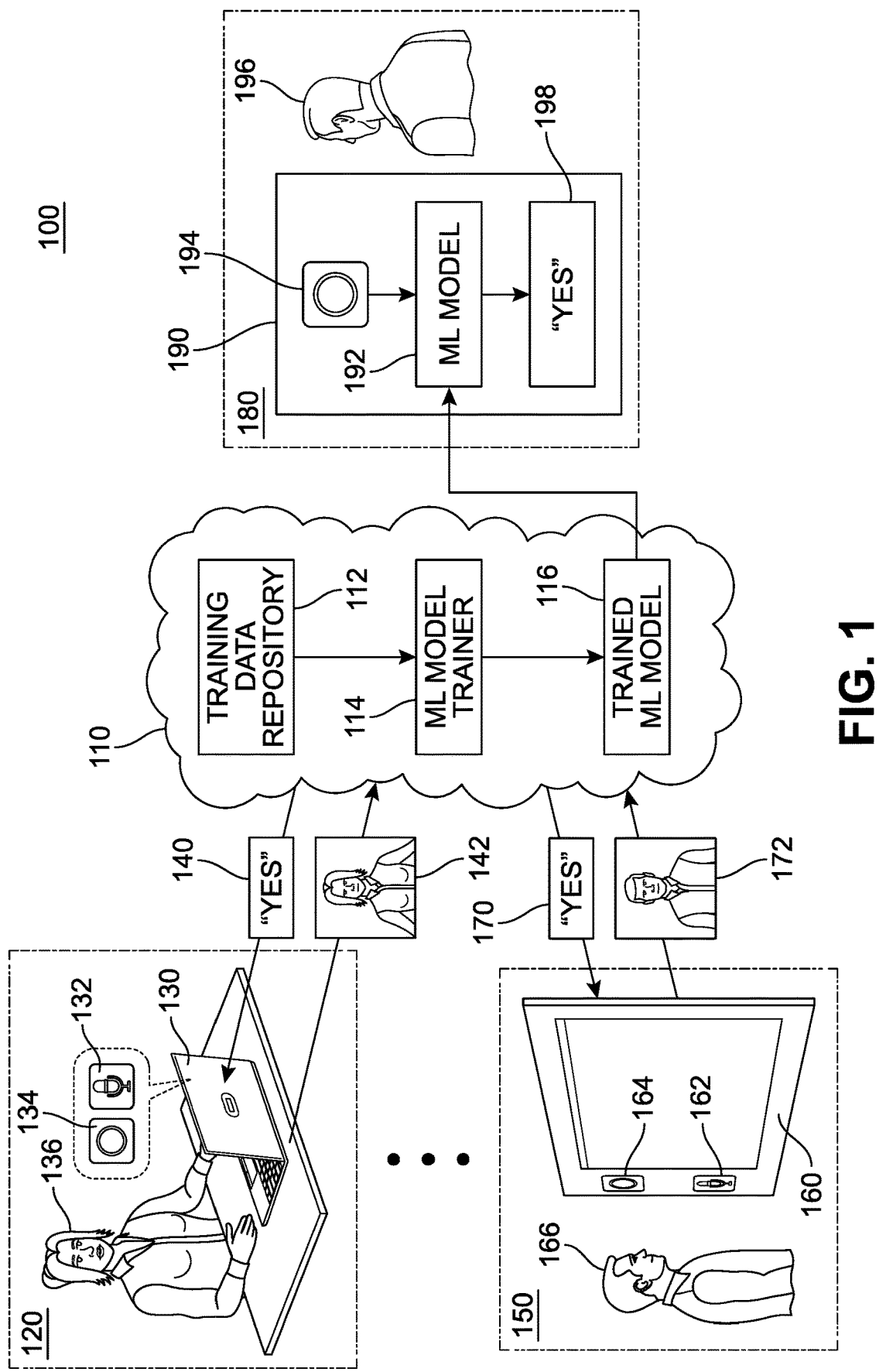
FIG. 1 illustrates an example architecture for configuring and using a plurality of training data collection devices to obtain training data for a variety of contexts, training a new trained ML model, and applying the new ML model on another system or device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

The following description is directed mainly to systems and methods for automated identification, selection, and collection of training data for training ML models, which avoid challenging and laborious manual selection and/or labeling of a new training dataset. As will be described below, the described techniques perform automated collection and labeling of large numbers of training data items reflecting a wide range of real-world environments and conditions.

Environmental sensor data (or "sensor data") can be obtained through the use of any type of environmental sensor (which, in some examples, may include control logic for control and/or communication) that measures the occurrence and/or degree of physical phenomena and provides information relating to such measurements. The term "environmental sensor" does not apply to contact-driven user input devices, such as, but not limited to, keyboards, mouse devices, and touchscreens.

For purposes of this disclosure, a "sensor type" (or "environmental sensor type") refers to a particular modality that an environmental sensor is designed to operate in and/or receive or detect information about. For example, some broad modalities may include, but are not limited to, audio, light, haptic, flow rate, distance, pressure, motion, chemical, barometric, humidity, and temperature. Within each of these modalities there is a wide array of specific modalities, or sensor types, as well as a wide array of sensor data types reflecting sensor measurements. As one example, the light modality includes visible (for example, RGB), infrared (IR), ultraviolet (UV), and all other possible subsets of the electromagnetic spectrum. Similarly, all frequency ranges of sound, including audible and inaudible sounds, fall within the audio modality. Furthermore, vibration, pressure, touch or contact data types are associated with the haptic modality.

For purposes of this disclosure, the term "label" applies to an output value of an event detector that characterizes an event instance. Such characterizations may include, but are not limited to one or more of: binary values (for example, indicating occurrence or non-occurrence of an event), category indicators (for example, chosen from a controlled or preselected set of vocabulary or categories), location information (for example, a region of interest bounding box around a detected face), numeric values (for example, integer or floating-point numbers), alphanumeric values, or any other type of identifiers or references. The term "labeling" refers to a process of generating a label for an input data. In different implementations, such labels may be used as target values for corresponding training data items for supervised ML training, with a label indicating one or more desired output values when a trained ML model is applied to the corresponding training data item. Accordingly, the term "label" may also apply to a target value for a training data item in ML training. Supervised ML training attempts to, using a collection of training data items and respective labels, infer an ML model that maps the training data items to their labels with reasonable accuracy and also labels unseen data items with reasonable accuracy. The corresponding unsupervised procedure is known as clustering, and involves grouping data into categories based on some measure of inherent similarity or distance. In the following disclosure, reasonably accurate first labels automatically generated for a first type of environmental data are used to characterize and generate second labels for a second type of environmental data.

For purposes of this disclosure, the term "device" may encompass one or more separately powered hardware units at a single location. For example, a training data collection device might be embodied as two units, with a first unit including a first environmental sensor, a communication unit (wireless or wired), and a battery, and a second unit configured to receive and process environmental data from the first unit. A device may be referred to as a "machine."

FIG. 1 illustrates an example architecture 100 for configuring and using a plurality of training data collection devices to obtain training data for a variety of contexts, training a new trained ML model 116, and applying the new ML model on another system or device. The architecture 100 may also be referred to as a system 100. The various features and activities illustrated in FIG. 1 are described generally, with further details and examples presented in connection with later figures. The architecture 100 includes a training system 110 configured to, among other things, identify a plurality of training data collection devices, including a first training data collection device 130 and a second training data collection device 160, and receive device-generated training data items from the identified training data collection devices. In some implementations, the training system 110 is further configured to deliver data, to the identified training data collection devices, used to configure the identified training data collection devices to automatically identify training events and generate corresponding device-generated training data. FIG. 1 illustrates an example in which real-time detection of a spoken target phrase in audio data is used to obtain training data including images (for example, RGB and/or IR images) of a speaker captured while the speaker is uttering the target phrase. The resulting training data may be used to, for example, generate a trained ML model 116 effective for detecting utterances of the target phrase from image data without the assistance of audio data.

In the example illustrated in FIG. 1, the training system 110 transmits a first training event detection data 140 to the first training data collection device 130 (in this example, a notebook computing device), which is at a first location 120 (which may also be referred to as "environment 120") and includes a first environmental sensor 132 and a second environmental sensor 134 that is different than the first environmental sensor 132. The first training event detection data 140 configures the first training data collection device 130 to identify events of a first event type (in this example, utterances of a target phrase "YES") based on measurements performed by the first environmental sensor 132. A first human subject 136 has uttered the target phrase, and as a result first device-generated training data 142, including one or more images capturing the first human subject 136 while uttering the target phrase, is generated and transmitted to the training system 110. The training system 110 receives the first device-generated training data 142, and may store a portion of the first device-generated training data 142 in a training data repository 112 (which may be referred to as a "training data storage module").

Similarly, the training system 110 transmits a second training event detection data 170 to the second training data collection device 160 (in this example, a large format computing device arranged for video conferencing), different than the first training data collection device 130, which is at a second location 150 (which may also be referred to as "environment 150") different than the first location 120, and includes a third environmental sensor 162 and a fourth environmental sensor 164 that is different than the third environmental sensor 162. The first training event detection data 170 configures the second training data collection device 160 to identify events of the same first event type (utterances of the target phrase "YES") based on measurements performed by the third environmental sensor 162. A second human subject 166 has uttered the target phrase, and as a result second device-generated training data 172, including one or more images capturing the second human subject 166 while uttering the target phrase, is generated and transmitted to the training system 110. The training system 110 receives the second device-generated training data 172, and may store a portion of the second device-generated training data 172 in the training data repository 112. The first and third environmental sensors 132 and 162 are of a same first sensor type (audio sensors), and measurements performed by the first and third environmental sensors 132 and 162 are used to obtain environmental data of a same first environmental data type. The second and fourth environmental sensors 134 and 164 are of a same second sensor type (image and/or video sensors) different than the first sensor type, and measurements performed by the second and fourth environmental sensors 134 and 164 are used to obtain environmental data of a same second environmental data type (images captured at specified frame rates) different than the first environmental data type.

The training system 110 may similarly interact with additional training data collection devices to obtain additional device-generated training data. Although the first and second training event detection data 140 and 170 are used to identify events of the same first event type, in some examples the training system 110 may transmit training event detection data for identifying different event types to different training data collection devices. Although in this example the first and second training event detection data 140 and 170 are directed to detecting human activity, training events are not limited to human activities. Additionally, embodiments of training data collection devices are not limited to the particular examples illustrated in FIG. 1, and may be embodied in a wide variety of form factors.

The training system 110 includes an ML model trainer 114 (which may be referred to as an "ML model training module") configured to generate a trained ML model 116 from device-generated training data obtained from the training data repository 112. The generation of the ML model may be referred to as "training" or "learning." The training system 110 may include and/or have access to substantial computation resources for training, such as a "cloud" including many computer server systems adapted for machine learning training. In some implementations, the ML model trainer 114 is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model 116 may be produced.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), and 2017/0262768 (published on Sep. 14, 2017 and entitled "Depth from Time-of-Flight Using Machine Learning"), which are each incorporated by reference herein in their entireties.

FIG. 1 further illustrates application of the trained ML model 116 by a trained system 190 at a third location 180 (which may be referred to as "environment 180"). The trained system 190 includes a fifth environmental sensor 194 of the same second sensor type (image and/or video sensors) as the second and fourth environmental sensors 134 and 164. The trained system 190 is also configured to use the trained ML model 116 as an ML model 192 for detecting events. In this example, the fifth environmental sensor 194 captures image frames of a third human subject 196 while the third human subject 196 is uttering the target phrase "YES." The trained system 190 detects an event instance 198 by applying the ML model 192 to the captured image frames. In response to the detection of the event instance 198, the trained system 190 performs additional responsive actions.

Figure 2:
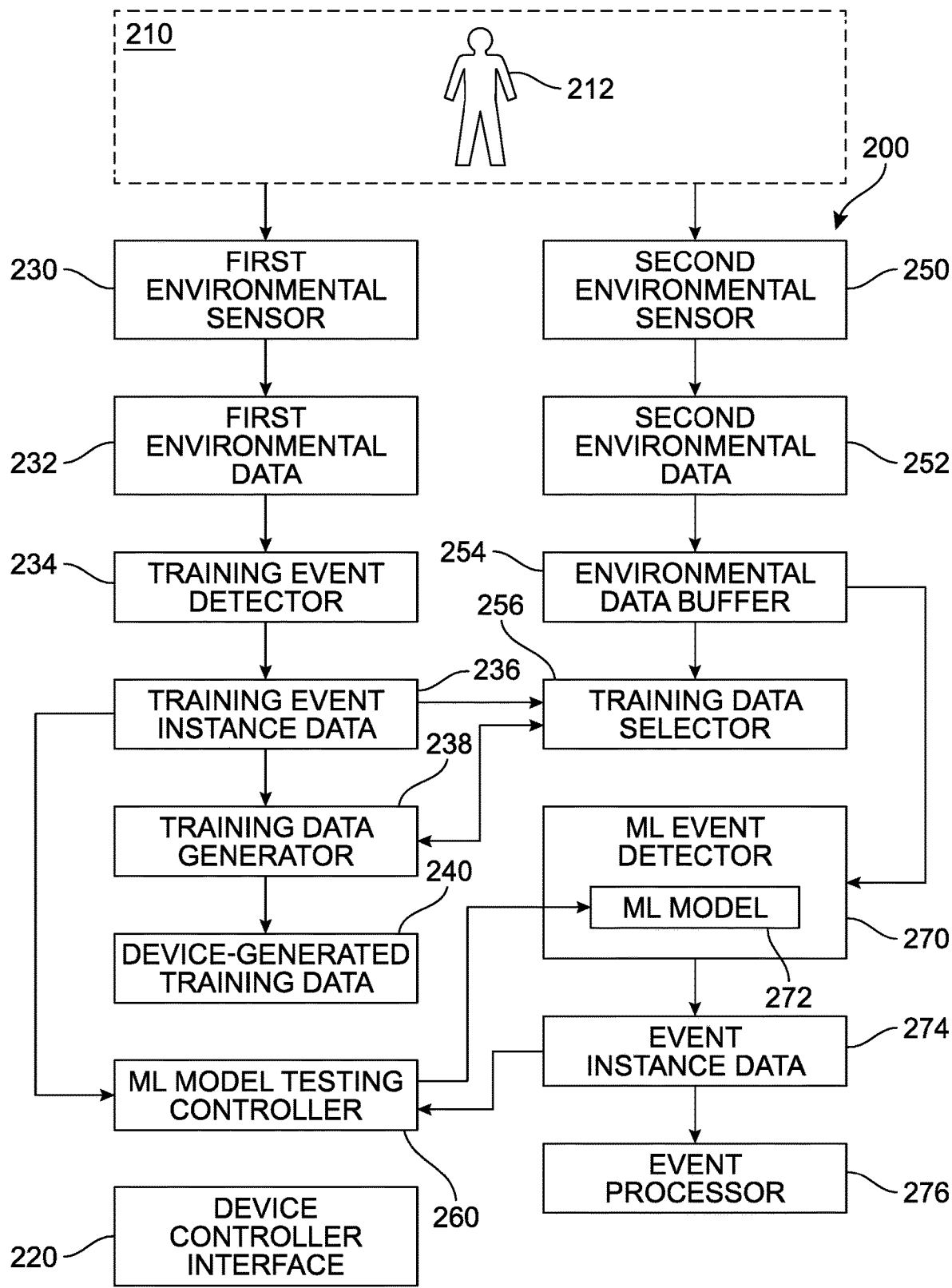
FIG. 2 illustrates an example training data collection device suitable for use in the architecture illustrated in FIG. 1.

FIG. 2 illustrates an example training data collection device 200 (which may simply be referred to as "device 200") suitable for use in the architecture 100 illustrated in FIG. 1. The features and techniques illustrated and described for the training data collection device 200 may be applied to the training data collection devices 130 and 160 in FIG. 1, and features and techniques illustrated and described for the training data collection devices 130 and 160 may be applied to the training data collection device 200. The training data collection device 200 includes a device controller interface 220 (which may be referred to as a "collection device control module") configured to communicate via a data communication network (not illustrated in FIG. 2) with one or more remote training systems, such as the training system 110 in FIG. 1 or the training system 400 below in FIG. 4. For example, the device controller interface 220 may receive commands and/or data from a training system, and may transmit responses and data to the same training system.

The training data collection device 200 includes a first environmental sensor 230 (which may be referred to as "first sensor 230") arranged to perform measurements of physical phenomena occurring at a location 210 (which may be referred to as "environment 210" or "scene 210"). The measurements performed by the first environmental sensor 230 may correspond to the presence and/or actions of one or more subjects at the location 210, such as a human subject 212 (although the subjects are not limited to human subjects). The training data collection device 200 obtains first environmental data 232 of a first environmental data type based on one or more of the measurements performed by the first environmental sensor 230. The first environmental data 232 may be provided as samples, each based on one or more measurements performed during a respective point and/or period of time. In some examples, the first environmental sensor 230 may be configured to periodically generate new samples at a sampling rate. For example, an imaging sensor may be configured to operate at a sampling rate (which may be referred to as a "frame rate" for an imaging sensor) of 10 samples per second, with each sample being an image frame captured by the imaging sensor. As another example, a monaural sound sensor may generate samples at a significantly higher sampling rate, such as 16000 samples per second, with each sample being just a single amplitude value. In some implementations, high sampling rate environmental data may be grouped into sets of multiple samples for processing. For example, sound sensor data might be grouped into frames containing 100 milliseconds worth of samples. In some examples, the size of such a group of samples may be selected to correspond to, and may be synchronized with, a sampling rate of another environmental sensor. The first environmental data 232 includes data generated based on measurements of physical phenomena performed by the first environmental sensor 230, which may include data provided by the first environmental sensor 230 without modification and/or data resulting from processing data provided by the first environmental sensor 230. For example, various operations applied to data provided by the first environmental sensor 230 include, but are not limited to, cropping, data selection, scaling (for example, to a fixed size), filtering, sampling, decimation, blurring, Fourier transform, normalization, sorting, clustering, gradient calculation, mean subtraction, whitening, dimensionality reduction, segmentation, matrix operations, background subtraction, convolution, calculating new features from multiple data values, feature detection, distortion correction, and/or edge detection.

The training data collection device 200 also includes a second environmental sensor 250 (which may be referred to as "second sensor 250"), which is also arranged to perform measurements of physical phenomena occurring at the location 210. The training data collection device 200 obtains second environmental data 252 of a second environmental data type based on one or more of the measurements performed by the second environmental sensor 250, much as described for the first environmental sensor 230. The second environmental data type is different than the first environmental data type. In some examples, the second environmental sensor 250 may be configured to periodically generate new samples at a sampling rate, and/or group the second environmental data 252 into sets of multiple samples for processing, much as described for the first environmental sensor 230.

In some implementations, the first environmental sensor 230 is of a first sensor type and the second environmental sensor 250 is of a second sensor type different than the first sensor type. While being used to collect training data, the training data collection device 200 operates the first and second environmental sensors 230 and 250 concurrently, such that new samples of the first environmental data 232 and new samples of the second environmental data 252 are both generated for a period of time. Although not necessary in all examples, in some examples it may be preferable for measurements performed by the first environmental sensor 230 to be synchronized with measurements performed by the second environmental sensor 250. It is noted that although FIG. 1 illustrates an example in which environmental sensors 132 and 134 are included in a single computing device 130, in some implementations the first and second environmental sensors 230 and 250 may be included in different respective devices, which may be separately powered. In some examples, samples of the second environmental data 252 may be temporarily stored in an environmental data buffer 254 (which may be referred to as an "environmental data buffering module") to accommodate latency in detecting events based on the first environmental data 232.

The device controller interface 220 is configured to receive, from a remote training system, training event detection data (not illustrated in FIG. 2) for identifying events of a first event type (which may be referred to as a "training event type") based on at least environmental data of the first environmental data type, such as the first environmental data 232. The training event detection data may be provided in various forms including, but not limited to, configuration data and/or program instructions for execution by the training data collection device 200 and associated data. Based on the received training event detection data, the device controller interface 220 and/or training data collection device 200 configures a training event detector 234 (which may be referred to as a "training event detection module") included in the data collection device 200 to identify events of the first event type based on at least environmental data of the first environmental data type. In some examples, the training data collection device 200 does not initially include some or all of the training event detector 234 and the configuration of the training event detector 234 includes creating some or all of the training event detector 234 (for example, by executing program instructions included in the received training event detection data). In some examples, the training event detector 234 may exploit already-existing detection logic (for example, the training data collection device 200 may already include a configurable speech detection module). In some examples, the training event detector 234 is configured to apply an ML model specified by the training event detection data.

The configured training event detector 234 receives the first environmental data 232, detects instances of the first event type based on at least the first environmental data 232, and produces training event instance data 236 corresponding to the detected event instances. In some examples, the training event detector 234 further performs labeling of the detected event instances, and data corresponding to one or more resulting labels may be included in the training event instance data 236. In some examples, the training event detector 234 further generates confidence values associated with the detection of event instances or generation of labels, and data corresponding one or more of the confidence values may be included in the training event instance data 236. In some circumstances, the training event detector 234 may detect multiple concurrent event instances in the first environmental data 232, and generate multiple corresponding items of training event instance data 236. Although not necessary in all examples, in some examples it may be preferable for the training event detector 234 to receive and process the first environmental data 232 in real time, where the training event detector 234 processes the first environmental data 232 at substantially a same rate at which it is generated. Real time processing allows the training data collection device 200 to reduce or minimize an amount of storage used for the first environmental data 232 and/or corresponding portions of the second environmental data 252.

Where multiple samples of the first environmental data 232 over time reflect occurrence of an event that the training event detector 234 is configured to identify, multiple items of corresponding training event instance data 236 can result. For example, if the first environmental data 232 is provided as a series of image frames, and the training event detector 234 is configured to detect the occurrence of human faces in such images, then, in some implementations, a separate training event instance may be identified, and one or more corresponding items of training event instance data 236 generated, for each image frame including a human face, even if training event instance data 236 was generated for the immediately preceding frame for the same human face. In some examples, the training event detector 234 may be configured to detect multiple different training events, and include corresponding labels in resulting training event instance data 236.

The training data collection device 200 includes a training data generator 238 (which may be referred to as a "training data generation module") configured to receive the training event instance data 236 generated by the training event detector 234 from the first environmental data 232, and selectively generate corresponding device-generated training data 240 based on at least selected portions of the second environmental data 252. In some implementations, the device controller interface 220 and/or training data collection device 200 may configure the training data generator 238 based on data received from a remote training system, much as described above for configuring the training event detector 234.

The training data generator 238 generates the device-generated training data 240 by automatically selecting portions of the second environmental data 252 (which may be temporarily stored in the environmental data buffer 254) that correspond to respective items of training event instance data 236 (which in turn are identified based on corresponding portions of the first environmental data 232 and corresponding measurements performed by the first environmental sensor 230). For example, training data generator 238 may be configured to select a first portion of the second environmental data 252 based on at least the first portion of the second environmental data 252 corresponding to a first measurement performed by the first environmental sensor 230 for an item of training event instance data 234. For example, the first portion of the second environmental data 252 may correspond to the first portion of the second environmental data 252 being based on a measurement performed by the second environmental sensor 250 at approximately a same time that the first measurement was performed. The resulting device-generated training data 240 may be stored at the training data collection device 200. The resulting device-generated training data 240 may be delivered to a remote training system, via the device controller interface 220, for use in generating one or more ML models, as described for the trained ML model 116 in FIG. 1 and discussed in more detail examples below. In some examples, the device-generated training data 240 is used for local training, at the training data collection device 200, of an ML model. In some examples, the device-generated training data 240 may include additional metadata, such as a location of capture, time and date of capture, hardware details of the first environmental sensor 230 and/or the second environmental sensor 250 (such as, but not limited to, make, model, and/or resolution), and/or operating parameters of the first environmental sensor 230 and/or the second environmental sensor 250 (such as, but not limited to, sample rate, exposure time, and/or quality setting). The metadata may be used for automatically selecting appropriate training data items for training a particular ML model.

In some implementations, the training data generator 238 is configured to utilize a training data selector 256 (which may be referred to as a "training data selection module"). The training data selector 256 is configured to automatically select a subportion of the second environmental data 252. In such implementations, the device-generated training data 240 is generated based on at least the selected subportion of the second environmental data 252. The selection may be made based on a region of interest (ROI) indicated by the training event instance data 236; for example, a time, direction, position, area (including, for example, a bounding box or a bitmap), and/or volume indicated by the training event instance data 236. This allows for a reduction in size of the device-generated training data 240 by omitting portions of the second environmental data 252 (or data derived therefrom) that would have little or no effect on training, and corresponding reductions in storage space, bandwidth, and computation for handling of the resulting device-generated training data 240. In some implementations, the device controller interface 220 and/or training data collection device 200 may configure the training data selector 256 based on training portion selection data received from a remote training system, much as described above for configuring the training event detector 234.

In some implementations, the training data generator 238 is configured (for example, by the device controller interface 220) to apply various criteria to select training event instances for which corresponding device-generated training data 240 is generated. One such criteria may be a similarity of training data provided by the training data selector 256 for a current training event instance to training data for a previous training event instance. For example, techniques such as fingerprinting, hashing, local feature analysis, or sum of squared difference may be used to determine the training data for the current event instance is too similar to previous training data to be likely to meaningfully improve upon previous device-generated training data 240. Another such criteria is whether the training event instance data 236 indicates a low confidence value (such as below a threshold confidence value), with such training event instance data items not resulting in corresponding device-generated training data 240.

In some implementations, the training data collection device 200 may be configured for testing an ML model 272, such as an ML model trained using device-generated training data such as the device-generated training data 240, and further include an ML model testing controller 260 (which may be referred to an "ML model testing control module") and an ML event detector 270 (which may be referred to an ML event detection module") for that purpose. In some implementations, the device controller interface 220 and/or training data collection device 200 may configure the ML model testing controller 260 and/or the ML event detector 270 based on data received from a remote training system, much as described above for configuring the training event detector 234. The ML model testing controller 260 receives the ML model 272 from a remote system (for example, from a training system via the device controller interface 220), and configures the ML event detector 270 to apply the received ML model 272 to detect events of a second event type (which may be the same as, or different than, the first event type) based on the second environmental data 252, and generate corresponding event instance data 274. The event instance data 274 may be generated much as described above for the training event instance data 236.

As described above for generating device-generated training data 240, the first and second environmental sensors 230 and 250 both perform measurements over a period of time to measure physical phenomena at location 210, resulting in respective first and second environmental data 232 and 252. In some implementations, the device controller interface 220 and/or training data collection device 200 configures the training event detector 234 to detect events of the second event type based on at least environmental data of the first environmental data type, much as previously described for configuring the training event detector 234 for collecting device-generated training data 240. The ML event detector 270 is applied to the second environmental data 252, resulting in items of event instance data 274, and the training event detector 234 is applied to the first environmental data 232, resulting in items of training event instance data 236. The ML model testing controller 260 is configured to compare the items of event instance data 274 against corresponding items of training event instance data 236 (for example, items generated based on measurements performed at approximately a same time). The ML model testing controller 260 records a testing result based on the comparison, and testing results recorded over a period of time are transmitted to a remote system for evaluation. In some examples, where the comparison determines there is a substantial difference, a corresponding item of device-generated training data 240 is generated, much as previously described, as it may be useful for further generalization of (or, in some cases, specialization of) later ML models.

In some implementations, the training data collection device 200 is configured to apply an ML model 272, such as an ML model trained using device-generated training data 240, for identifying event instances for a third event type (which may be the same as, or different than, the first event type) in a non-testing configuration. In this configuration, the training data collection device 200 includes the ML event detector 270, which generates event instance data 274 as previously described. The generated event instance data 274 is provided to an event processor 276 (which may be referred to an "even processing module"), such as an application software program, configured to respond to events of the third event type based on received event instance data 274.

Figure 3:
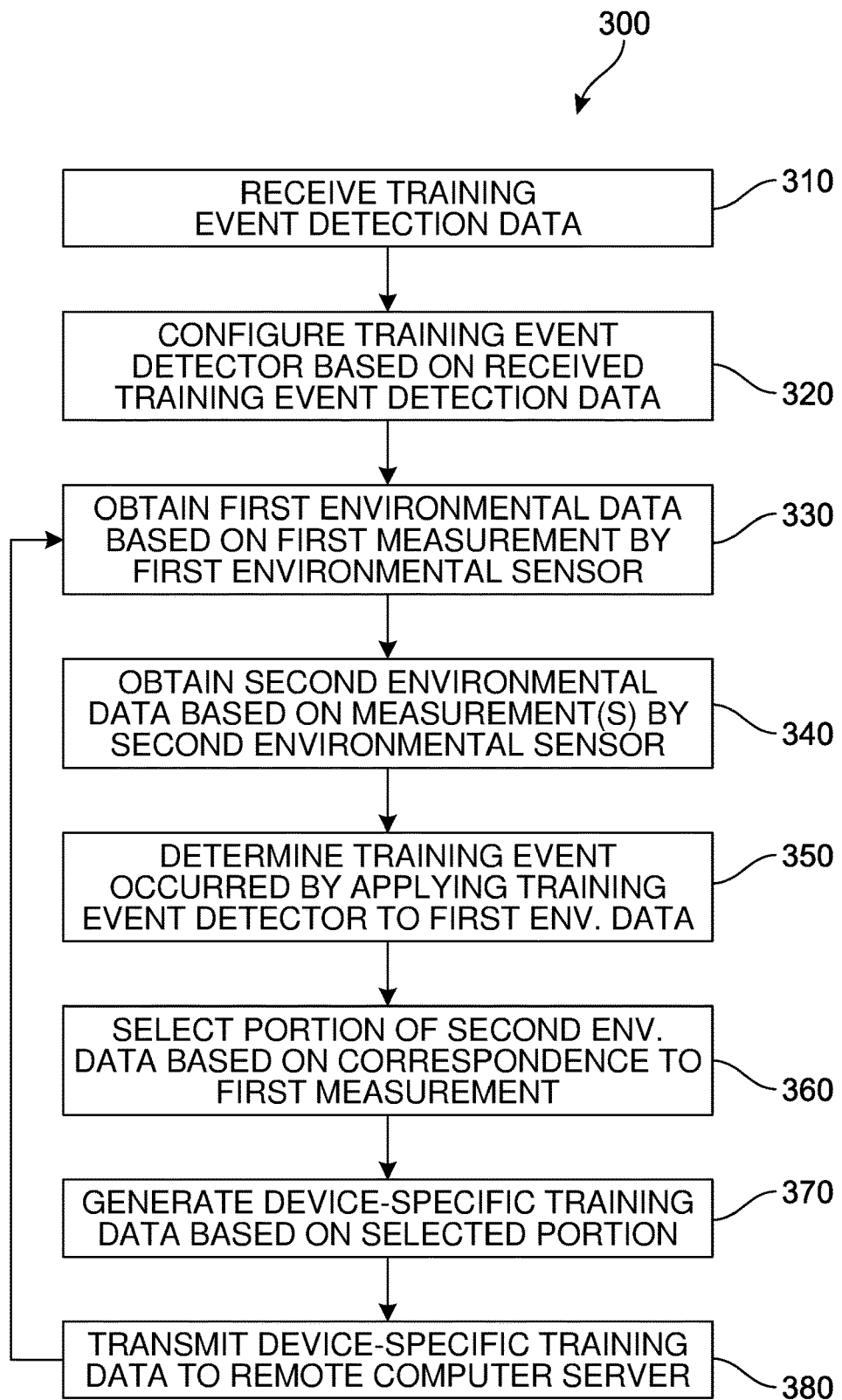
FIG. 3 illustrates an example process for collecting device-generated training data using a training data collection device, such as the training data collection device illustrated in FIG. 2.

FIG. 3 illustrates an example process 300 for collecting device-generated training data using a training data collection device, such as the training data collection device 200 illustrated in FIG. 2. Further details and examples of various aspects of the process 300 described in FIG. 2 may be applied to the process 300. At an operation 310, the process 300 begins with receiving, at the training data collection device, training event detection data for identifying events of a first event type based on at least environment data of a first environmental type. At operation 320, based on the training event detection data received at operation 310, the process 300 continues with configuring a training event detector included in the training data collection device to identify events of the first event type based on at least environment data of the first environmental type.

At operation 330, the process 300 includes obtaining first environmental data of the first environmental data type based on at least a first measurement performed, at a first location and at a first time, by a first environmental sensor included in the training data collection device. At operation 340, the process 300 includes also obtaining second environmental data of a second environmental data type based on at least one or more measurements performed by a second environmental sensor at the first location. The second environmental data type is different than the first environmental data type. The one or more measurements may include a measurement performed at about the first time.

At operation 350, the process 300 includes automatically determining, based on at least applying the training event detector (configured in operation 320) to the first environmental data, that a first event occurred at about the first time. At operation 360, the process 300 includes automatically selecting a first portion of the second environmental data based on at least the selected first portion of the second environmental data corresponding to the first measurement performed by the first environmental sensor in the operation 330. At operation 370, the process 300 includes generating device-generated training data based on at least the first portion of the second environmental data selected in operation 360. At operation 380, the process 300 includes transmitting the device-generated training data generated in operation 370 to a remote computer server.

Figure 4:
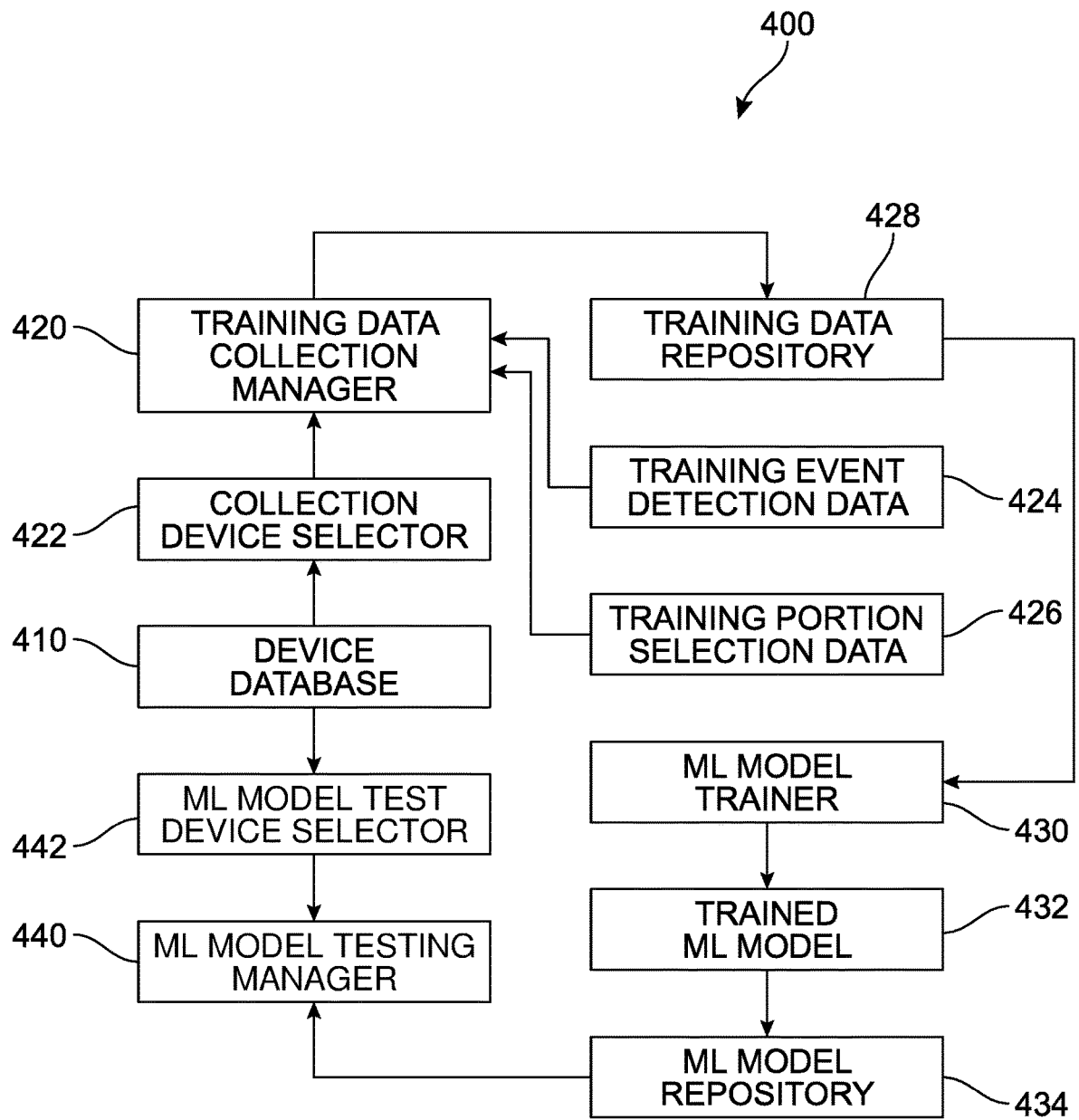
FIG. 4 illustrates an example training system suitable for use in the architecture illustrated in FIG. 1.

FIG. 4 illustrates an example training system 400 suitable for use in the architecture 100 illustrated in FIG. 1. The features and techniques illustrated and described for the training system 400 may be applied to the training system 110 in FIG. 1, and features and techniques illustrated and described for the training system 110 may be applied to the training system 400. The training system 400 may also be referred to as a "remote training system," "training computer system," or "remote computer server" in examples in which the training system 400 communicates remotely with training data collection devices (such as the training data collection device 200 in FIG. 2) via one or more data communication networks (such as, but not limited to, the Internet). In some implementations, the training system 400, or a portion thereof, is embodied as a "cloud" computing system including multiple network-connected computer server systems.

The training system 400 includes a device database 410 (which may be referred to a "device database module") configured to record information about computing devices that may be recruited by the training system 400 for training data collection and/or ML model testing. The device database 410 is further configured to perform query-based retrieval of device information, to facilitate device identification and selection. In some implementations, or for some devices, an opt-in procedure must be performed by a user, owner, or administrator of a device to add the device to the device database 410 and/or indicate the device is active for use by the training system 400 (for training data collection and/or ML model testing) in the device database 410. In some implementations, various options affecting use of a device by the training system 400 and/or handling of device-generated training data received by the training system 400 may be user configurable; such options may include, but not be limited to, bandwidth limitations, time-based restrictions, location-based restrictions (for mobile devices, for example), and/or sensor device limitations (for example, a user may indicate that a microphone or a camera may not be used by the training system 400). In some implementations, the device database 410 implements access controls to prevent unauthorized access to device information.

The training system 400 includes a training data collection manager 420 (which may be referred to as a "training data collection management module") configured to identify, communicate with, and control collection of device-generated training data by, multiple training data collection devices (such as the training data collection device 200 in FIG. 2). In some examples, the training data collection manager 420 is configured to use a collection device selector 422 (which may be referred to as a "device selection module") to select devices from the device database 410 for a particular training data collection campaign. Information relating to a training data collection campaign, such as, but not limited to, acceptable sensor types and/or sensor specifications, may be provided to the collection device selector 422 to select appropriate devices. The training data collection manager 420 is configured to communicate with a device control interface, such as the device controller interface 220 in FIG. 2, provided by each training data collection device. In some implementations, via such communication, the training data collection manager 420 may deliver training event detection data 424 for automatically identifying events based on environmental data to training data collection devices. In some implementations, via such communication, the training data collection manager 420 may deliver training portion selection data 426 for automatically selecting subportions of environmental data used to generate device-specific training data to training data collection devices. In some implementations, via such communication, the training data collection manager 420 may receive device-generated training data from training data collection devices. In some implementations, via such communication, the training data collection manager 420 may provide the received device-generated training data to a training data repository 428 (which may be referred to as a "training data storage module"). For a training data collection campaign, the training data collection manager 420 may recruit and configure multiple training data collection devices, receive device-generated training data items from multiple training data collection devices, and receive multiple device-generated training data items from each of multiple training data collection devices. As a result, the training system 400 is able to collect and learn from training data reflecting a wide variety of environments and situations. It is noted that in some examples, a single training data collection device may be configured by the training system 400 to concurrently collect training data for multiple training data collection campaigns.

In some implementations, the training data repository 428 is configured to selectively incorporate device-generated training data items, or selected portions thereof, received by the training data collection manager 420 from various training data collection devices. By collecting training data reflecting a variety of environments and/or subjects, a more generalized trained ML model may be produced. In some implementations, various criteria may be applied for selectively incorporating device-generated training data items into, or removing device-generated training data items from, the training data repository 428. For example, age and/or a number of similar or related training data items already maintained by the training data repository 428 may affect the incorporation or retention of training data items in the training data repository 428. The training data repository 428 may further be configured to store information used to select and retrieve selected collections of training data items. An example training data record maintained by the training data repository 428 including information useful for selecting training data of interest is illustrated and described in FIG. 5. In some implementations, the training data repository 428 implements access controls to prevent unauthorized access to training data.

The training system 400 further includes an ML model trainer 430 (which may be referred to as an "ML model training module") configured to train one or more ML models, including a trained ML model 432, using training data items stored in the training data repository 428, much as previously described for the ML model trainer 114 in FIG. 1. The ML model trainer 430 may be configured to selectively apply training data items retrieved from the training data repository 428 to generate ML models. In some examples, a device-specific ML model may be generated for a selected training data collection device, using only training data items received from the selected device, or more heavily weighting training data items received from the selected device. In some examples, a model-specific ML model may be generated for a selected sensor model and/or device model, using only training data items received from the selected device model or devices including the selected sensor model, or more heavily weighting training data items received from the selected device model or devices including the selected sensor model. In some example, a generalized ML model may be generated using training data items covering a wide variety of locations and/or situations. In some implementations, ML models generated by the ML model trainer, such as the trained ML model 432, are stored in an ML model repository 434 (which may be referred to as an "ML model storage module"). The ML model repository 434 is configured to retrieve and provide selected trained ML models.

Some implementations of the training system 400 are configured to utilize devices recorded in the device database 410 for automatically testing the effectiveness of a trained ML model 432 in various environments and situations. In such implementations, the system 400 further includes an ML model testing manager 440 (which may be referred to as an "ML model testing management module") configured to identify, communicate with, and control testing of one or more ML models trained by the ML model trainer 430 by, multiple devices recorded in the device database 410 (such as the training data collection device 200 in FIG. 2). A device used for ML model testing may be referred to as "ML model testing device." In some examples, the ML model testing manager 440 is configured to use an ML model test device selector 442 (which may be referred to as an "ML model test device selection module") to select devices from the device database 410 for testing a particular ML model. Information relating to testing the ML model, such as, but not limited to, acceptable sensor types and/or sensor specifications, may be provided to the ML model test device selector 442 to select appropriate devices. The ML model testing manager 440 is configured to communicate with a device control interface, such as the device controller interface 220 in FIG. 2, provided by each ML model testing device, much as described above for communication performed by the training data collection manager 420. Via such communication, the ML model testing manager 440 may deliver training event detection data 424 for automatically identifying events based on environmental data to ML model testing devices, deliver ML models to ML model testing devices, receive testing results from ML model testing devices, and receive new device-generated training data items resulting from testing. The ML model testing manager 440 may be configured to, based on at least testing results received for an ML model from the ML model testing devices, automatically select one of multiple candidate ML models, automatically initiate collection of additional training data via the training data collection manager 420, and/or automatically train one or more new ML models using the ML model trainer 432 and modified training parameters.

Figure 5:
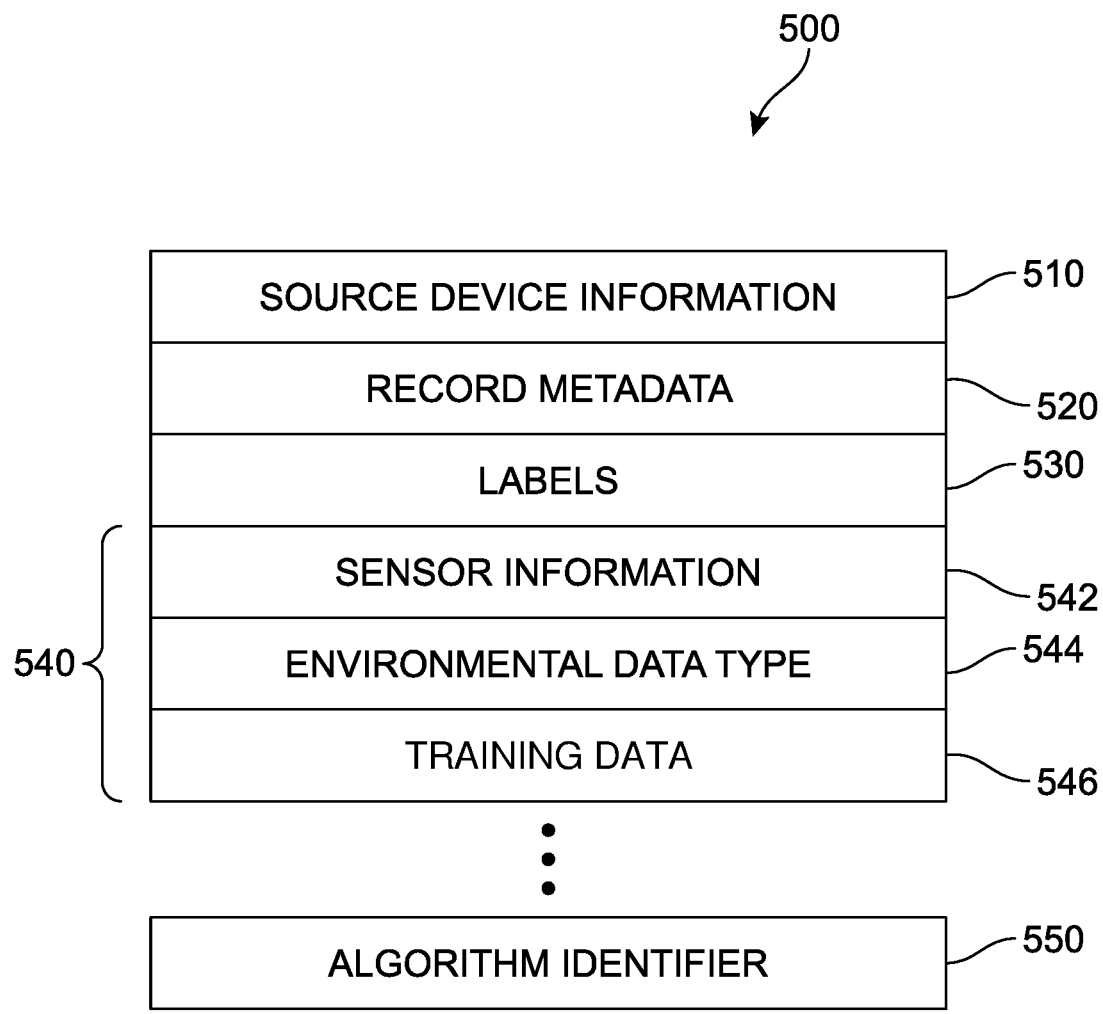
FIG. 5 shows example information items, illustrated as fields of a training data record that may be stored in, maintained by, accessible from, and used for queries performed by, the training data repository illustrated in FIG. 4.

FIG. 5 shows example information items, illustrated as fields of a training data record 500 that may be stored in, maintained by, accessible from, and used for queries performed by, the training data repository 428 illustrated in FIG. 4. These information items may be used to selectively retrieve training data items from the training data repository 428 for training performed by the ML model trainer 430. Additionally, this information may be used to later, in connection with different ML model development efforts, identify already-collected training data items that may be useful for a producing and/or testing a desired ML model. It is noted that training data record 500 is merely an example, and that fewer or additional information items may be included in the training data record 500, and/or in a different order or arrangement than illustrated in FIG. 5.

The training data record 500 may include source device information 510 about the device that generated training data 546 included in the training data record 500. In some examples, the source device information 510 may simply be a device-unique identifier that may be used to retrieve additional details about the device from the device database 410. In some examples, a device-unique identifier may be omitted from the training data record 500, to anonymize training data items.

The training data record 500 may further include record metadata 520 relating to the generation of the training data 546 and/or the training data record 500. Example metadata includes, but is not limited to, a date and/or time (for example, for a measurement associated with the training data 546, for creation of a corresponding device-generated training data item, and/or creation of the training data record 500), a location, a subject identifier, and/or a user identifier.

The training data record 500 may further include one or more labels 530, which may include one or more labels generated by a training data collection device in the course of training event detection and/or training data selection. In some examples, an implicit label not expressly indicated by the training data collection device may be recorded; for example, if training event detection data was provided to the training data collection device that is configured to identify dogs in image data, a "dog" label may be included even if not indicated by the training data collection device. In training, one or more of the labels 530 may be used in connection with training data 546 for supervised learning techniques, with a goal of training an ML model to automatically apply the same label(s) to the training data 546 and similar data.

The training data record 500 further includes one or more training data entries, similar to the illustrated first training data entry 540. The training data entry 540 may include sensor information 542 indicating details of one or more environmental sensors used to perform measurements on which the training data 546 is based. The training data entry 540 may include an environmental data type 544 specifying an environmental data type for the training data 546. The training data entry includes training data 546, such as data provided by the training data selector 256 to the training data generator 238 and generated based on at least a selected portion of the second environmental data 252.

The training data record 500 may further include an algorithm identifier 550, which may identify training event detection data and/or training portion selection data provided to the training data collection device. The algorithm identifier 550 may be used to, for example, identify and remove training data records generated based on outdated algorithms.

Figure 6:
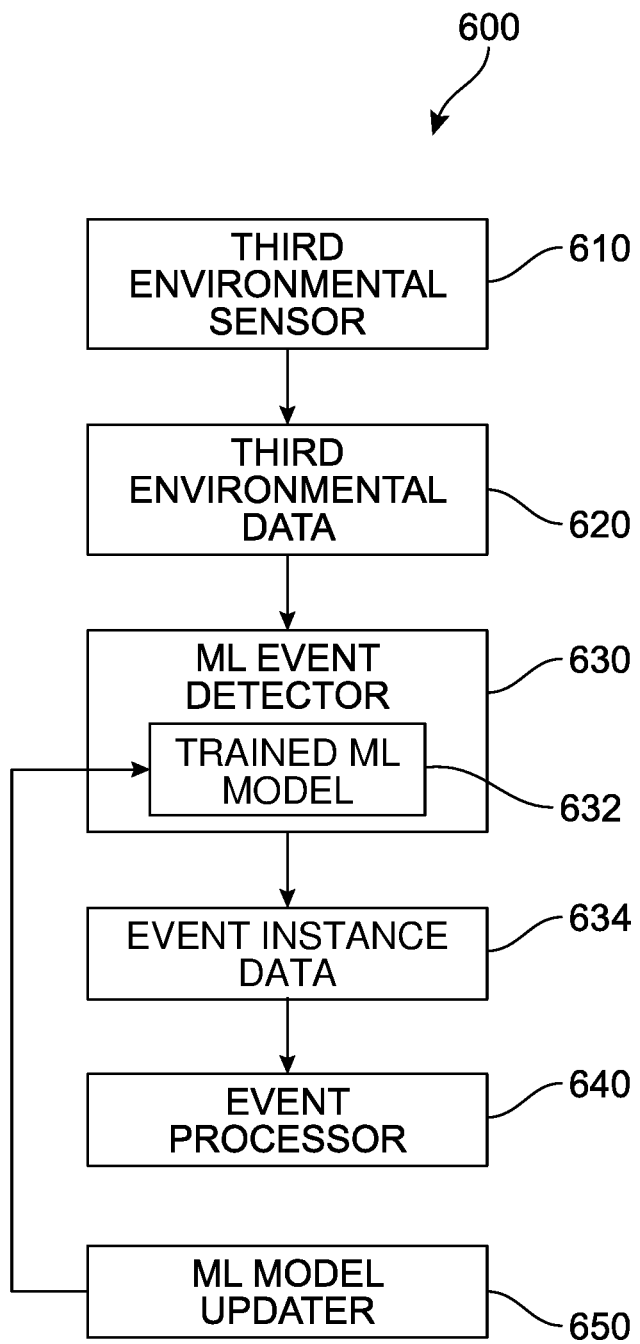
FIG. 6 illustrates a trained system configured to process event instances identified by applying a trained ML model generated by the training system in FIG. 4 to environmental data obtained by the trained system.

FIG. 6 illustrates a trained system 600 configured to process event instances identified by applying a trained ML model 632 generated by the training system 400 in FIG. 4 to third environmental data 620 obtained by the trained system 400. The features and techniques illustrated and described for the trained system 600 may be applied to the trained system 190 in FIG. 1, and features and techniques illustrated and described for the trained system 190 may be applied to the trained system 600. The trained system 600 includes a third environmental sensor 610 and is configured to generate third environmental data 620 based on measurements performed by the third environmental sensor 610, much as described for the second environmental data 250 in FIG. 2.

In some examples, the third environmental sensor 610 is of a same sensor type as the second environmental sensor 250 in FIG. 2. In some examples, the third environmental data 620 is of a same environmental data type as the second environmental data 252 in FIG. 2.

The trained system 600 includes an ML event detector 630 (which may be referred to as an "ML event detection module") configured to detect events of the third event type by applying the trained ML model 632 to the third environmental data 620. The ML event detector 630 operates much as previously described for the ML event detector 270 and the ML model 272 in FIG. 2. For each event instance identified by the ML event detector 630, a corresponding item of event instance data 634, similar to the event instance data 274 in FIG. 2, is output by the ML event detector 630. The trained system 600 further includes an event processor 640 (which may be referred to as an "event processing module"), such as, but not limited to, an application software program, configured to respond to events of the third event type based on received event instance data 634.

In some implementations, the system 600 may further include an ML model updater 650 (which may be referred to as an "ML model updating module") configured to determine if an updated ML model is available, obtain the updated ML model (for example, from the ML model repository 434 in FIG. 4), and reconfigure the ML event detector 630 to apply the obtained updated ML model instead of the previous ML model 632. For example, parameters specified by the updated ML mode for a ML algorithm may replace similar parameters used for the previous ML model 632.

Figure 7:
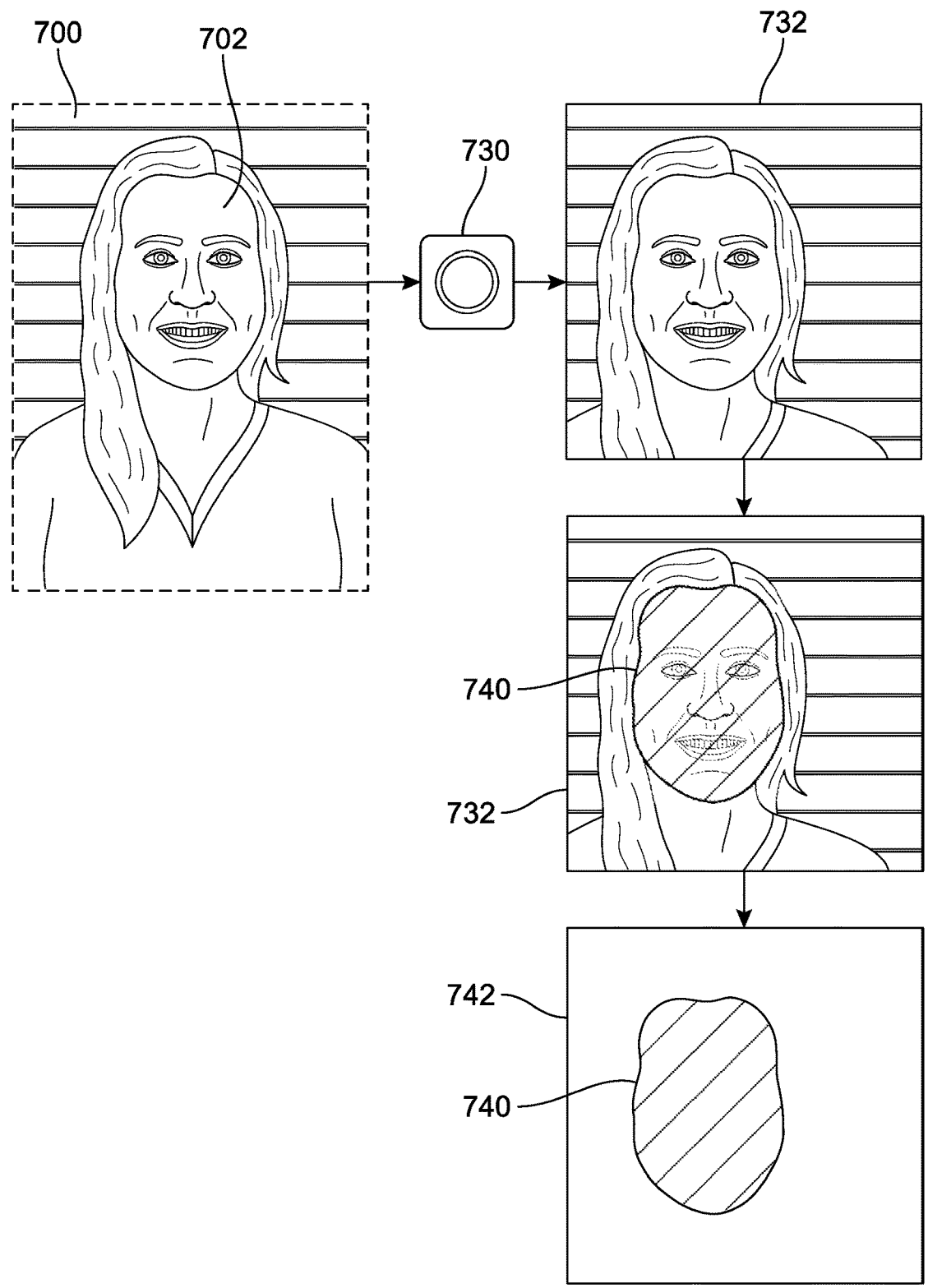
FIG. 7 illustrates aspects of a first example application of the disclosed techniques, in which a fourth environmental sensor included in a second training data collection device is used to detect an instance of a training event.
Figure 8:
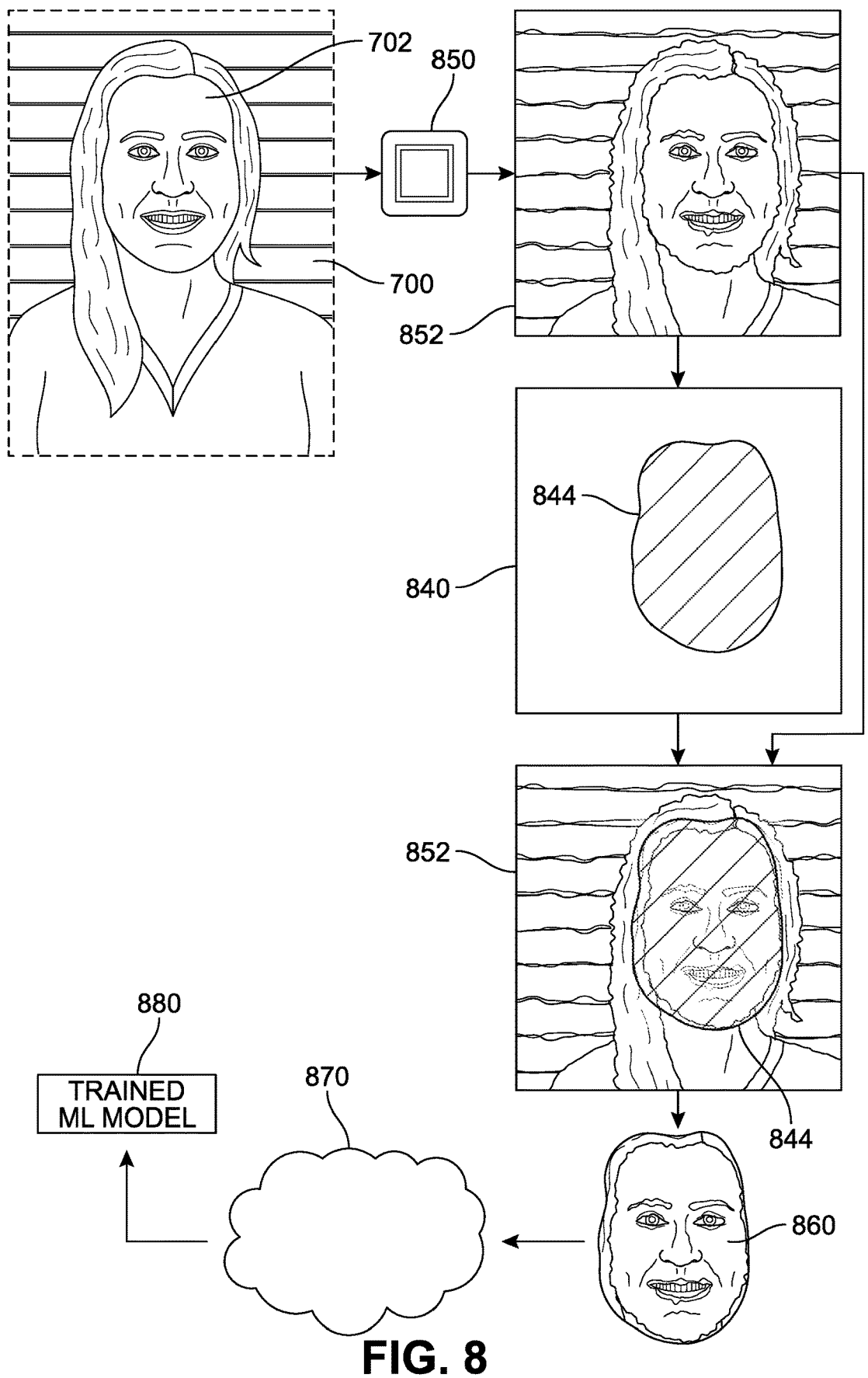
FIG. 8 illustrates a continuation of the example illustrated in FIG. 7, in which a fifth environmental sensor included in the second training data collection device is used to obtain environmental data corresponding to the detected training event instance and used to produce a new trained ML model.
Figure 9:
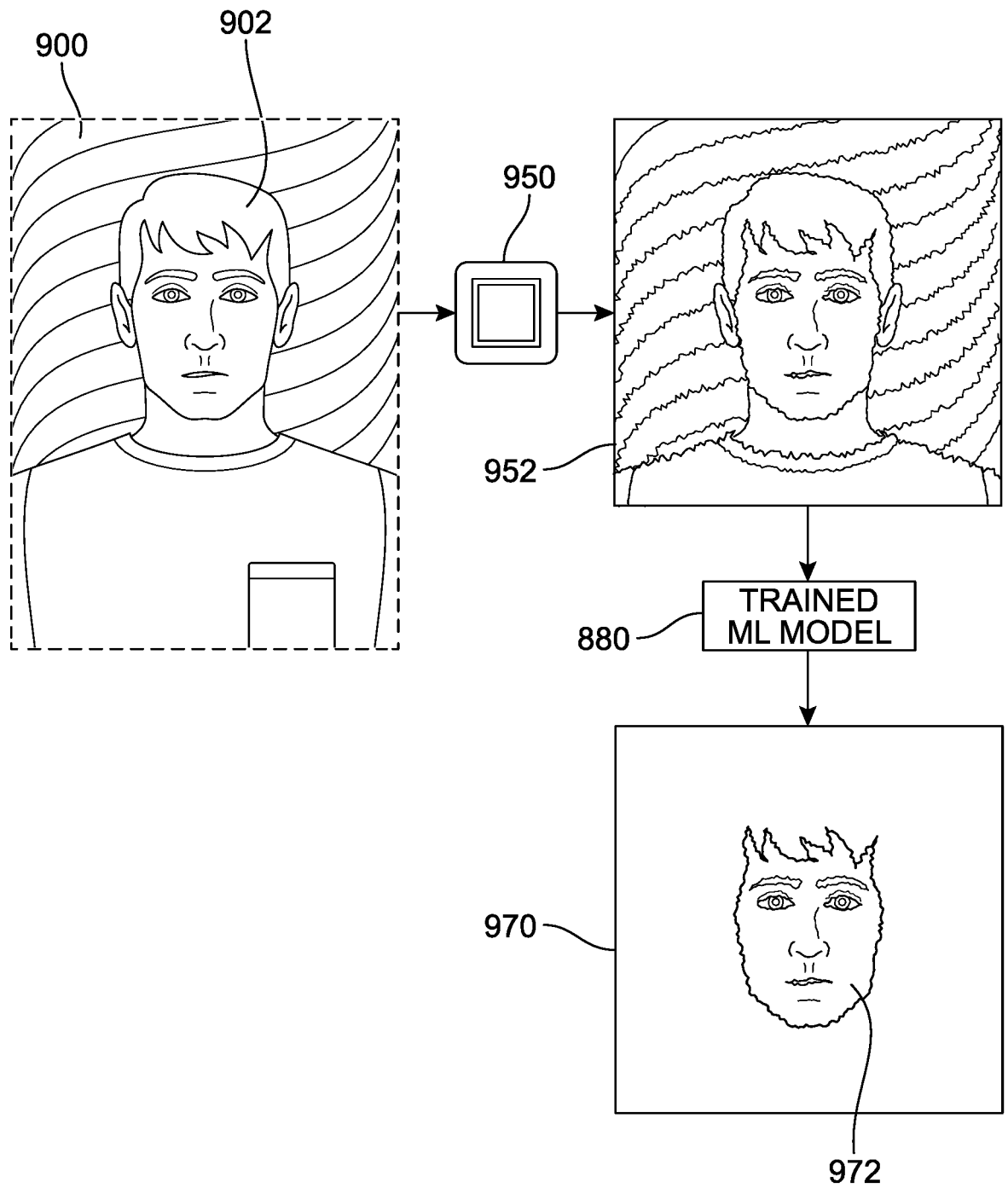
FIG. 9 illustrates a continuation of the example illustrated in FIGS. 7 and 8, in which an event instance is identified and labeled by applying the trained ML model generated in FIG. 8 on a second trained system.

Referring now to FIGS. 7-9, a sequence of figures illustrates a first example application of the techniques described herein. It should be understood that the following illustrations are for purposes of example only, and a wide variety of other implementations are possible that correspond to the disclosed techniques. The features and techniques illustrated and described for the architecture 100, training data collection device 200, process 300, training system 400, and the trained system 600 in FIGS. 1-6 may be applied to the example in FIGS. 7-9, and features and techniques illustrated and described for the example in FIGS. 7-9 may be applied to the architecture 100, training data collection device 200, process 300, training system 400, and the trained system 600 in FIGS. 1-6.

FIG. 7 illustrates aspects of the first example application in which a fourth environmental sensor 730 included in a second training data collection device is used to detect an instance of a training event. For purposes of this particular example, the fourth environmental sensor 730 includes an IR imaging sensor (such as an IR camera), and the second training data collection device is configured to obtain fourth environmental data of a fourth environmental data type (an IR image frame). The second training data collection device includes a second training event detector (not illustrated in FIG. 7) configured to detect a fourth event type (an area in which a human face is present) from the fourth environmental data. In this first example application, the second training data collection device is being used to automatically collect training data suitable for training an ML model effective for detecting the fourth event type from a fifth environmental data type (an RGB image frame).

FIG. 7 illustrates fourth environmental data 732 (a single IR image frame) obtained based on measurement of amounts of IR light received from a first location 700 performed by the fourth environmental sensor 730 at a first time. At the first time, a human subject 702 was facing the fourth environmental sensor 730 and within a field of view (FOV) of the fourth environmental sensor 730, resulting in a portion of the fourth environmental data 732 corresponding to a face of the human subject 702. The second training data collection device automatically determines, by applying the second training event detector to the fourth environmental data 732, that a first event of the fourth event type occurred at about the first time. The second training event detector further identifies a first region of interest (ROI) 740 for the first event, in the form of a bitmap 742 providing a per-pixel labeling of pixels of the fourth environmental data 732 included in the first ROI 740 (for example, with a keyword "face" or other such identifier). In some implementations, a rectangular bounding box may be used to identify the first ROI 740. In some implementations, the second training event detector applies an ML model trained to reliably segment human faces in IR images to identify the first event and the corresponding first ROI 740.

FIG. 8 illustrates a continuation of the example illustrated in FIG. 7, in which a fifth environmental sensor 850 included in the second training data collection device is used to obtain environmental data corresponding to the detected training event instance and used to produce a new trained ML model 880. For purposes of this particular example, the fifth environmental sensor 850 includes an RGB imaging sensor (such as an RGB camera), and the second training data collection device is configured to obtain fifth environmental data of a fifth environmental data type (an RGB image frame) based on measurements performed by the fifth environmental sensor 850. The fifth environmental data type is different than the fourth environmental data type. In some examples, the fourth environmental sensor 730 and the fifth environmental sensor 850 may be the same environmental sensor, but with different respective environment data types.

In some examples, as is illustrated in FIG. 8, the fifth environmental sensor 850 is a "low-cost sensor" in comparison to the fourth environmental sensor 730 (which may be, in this context, referred to as a "high-cost sensor"). For purposes of this description, a "low-cost sensor" or "economical sensor" refers to an environmental sensor that can be employed with substantially lower energy consumption or power, emitting substantially less heat, is substantially smaller in one or more dimensions and/or volume, requires substantially less maintenance, does not require specific operating conditions, produces sensor data requiring substantially less processing, and/or has a substantially lower monetary cost for manufacture and/or operation in comparison to another high-cost physical sensor. There may be a significant difference between a low-cost sensor and a high-cost sensor in the quality of the resulting environmental data. In this specific example, RGB images obtained from the low-cost fifth environmental sensor 850 have a substantially lower resolution and/or have substantially greater noise than IR images obtained from the high-cost fourth environmental sensor 730.

In this example, the fifth environmental sensor 850 is positioned adjacent or otherwise close to the fourth environmental sensor 730, with a known position and orientation relative to the fourth environmental sensor 730. The fourth environmental sensor 730 and the fifth environmental sensor 850 are both operated over a time period including the first time. FIG. 8 illustrates fifth environmental data 852 (a single RGB image frame) obtained based on measurement of amounts of light received from the first location 700 performed by the fifth environmental sensor 850 at about the first time. Much as with the fourth environmental data 732, a portion of the fifth environmental data 852 corresponds to the face of the human subject 702. For purposes of reference, the capture of environmental data across at least two environmental data types for a same event and period of time may be referred to as a capture of "combined event data."

Positions of pixels included in the first ROI 740 of the fourth environmental data 732 translated to corresponding positions in the fifth environmental data 852, resulting in a bitmap 840 providing a per-pixel labeling of pixels 844 of the fifth environmental data 852 identified as corresponding to measurements performed by the fifth environmental sensor 850 for the first ROI 740. As can be seen in FIG. 8, the identification of the pixels 844 may be overinclusive and/or underinclusive in various areas; for example, this may result from parallax between the fourth environmental sensor 730 and the fifth environmental sensor 850.

The bitmap 840 is used to automatically select a subportion 860 of the fifth environmental data 852, which is used to produce a first device-generated training data item, which is transmitted to a training system 870. In some examples, the first device-generated training data item may include one or more labels, such as the "face" keyword label generated by the second target event detector in FIG. 7. The first device-generated training data item, along with additional device-generated training data items received from the second training data collection device, and along with additional device-generated training data items received from the other training data collection devices, is used to train a trained ML model 880, much as previously described for the trained ML model 116 in FIG. 1 and the trained ML model 432 in FIG. 4. Over time, the remote training system 870 receives and accumulates more and more device-generated training data items from the second training data collection device and other training data collection devices, thereby increasing the amount and variety of training data available for ML model training, resulting in increased accuracy, effectiveness, and robustness of trained ML models.

FIG. 9 illustrates a continuation of the example illustrated in FIGS. 7 and 8, in which an event instance is identified and labeled by applying the trained ML model 880 generated in FIG. 8 on a second trained system. The second trained system includes a sixth environmental sensor 950, and the second trained system is configured to obtain sixth environmental data 952 of the fifth environmental data type (an RGB image frame) based on measurements performed by the sixth environmental sensor 950. In some implementations, the sixth environmental sensor 950 is a low-cost sensor similar to the fifth environmental sensor 850. The sixth environmental data 952 includes an image of a second human subject 902 (different than the first human subject 702) captured at a second location 900 (different than the first location 700) at a second time. The second trained system applies the trained ML model 880 to the sixth environmental data 952, which results in a determination that an instance of the fourth event type occurred at about the second time and a corresponding event distance data 970 including a bitmap 972 providing a per-pixel labeling of pixels of the sixth environmental data 952 corresponding to the identified event instance.

It should be understood that the details provided with respect to FIGS. 7-9 are for illustration only, and other sensor types, environmental data types, images, and/or labels can be used with the disclosed techniques. In other implementations, the high-cost sensor can be a thermal camera or depth sensor, for example. For example, thermal cameras or depth sensors can be used to reliably detect persons and/or faces in a wide range of illumination and environmental conditions.

Figure 10:
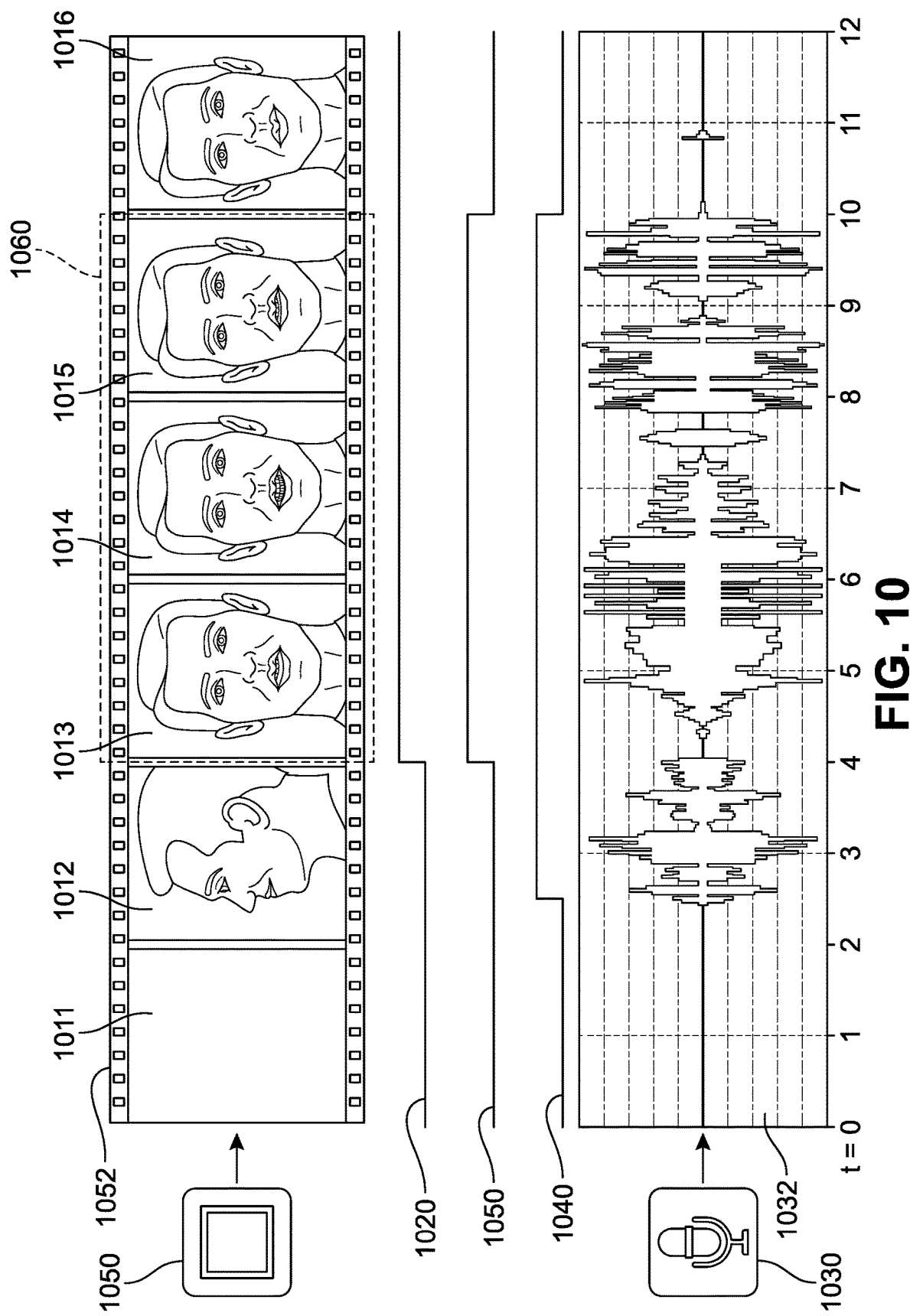
FIG. 10 second example application of the disclosed techniques, involving producing device-generated training data for a training event identified using a combined condition for event instances identified for environmental data of different environmental data types.
Figure 11:
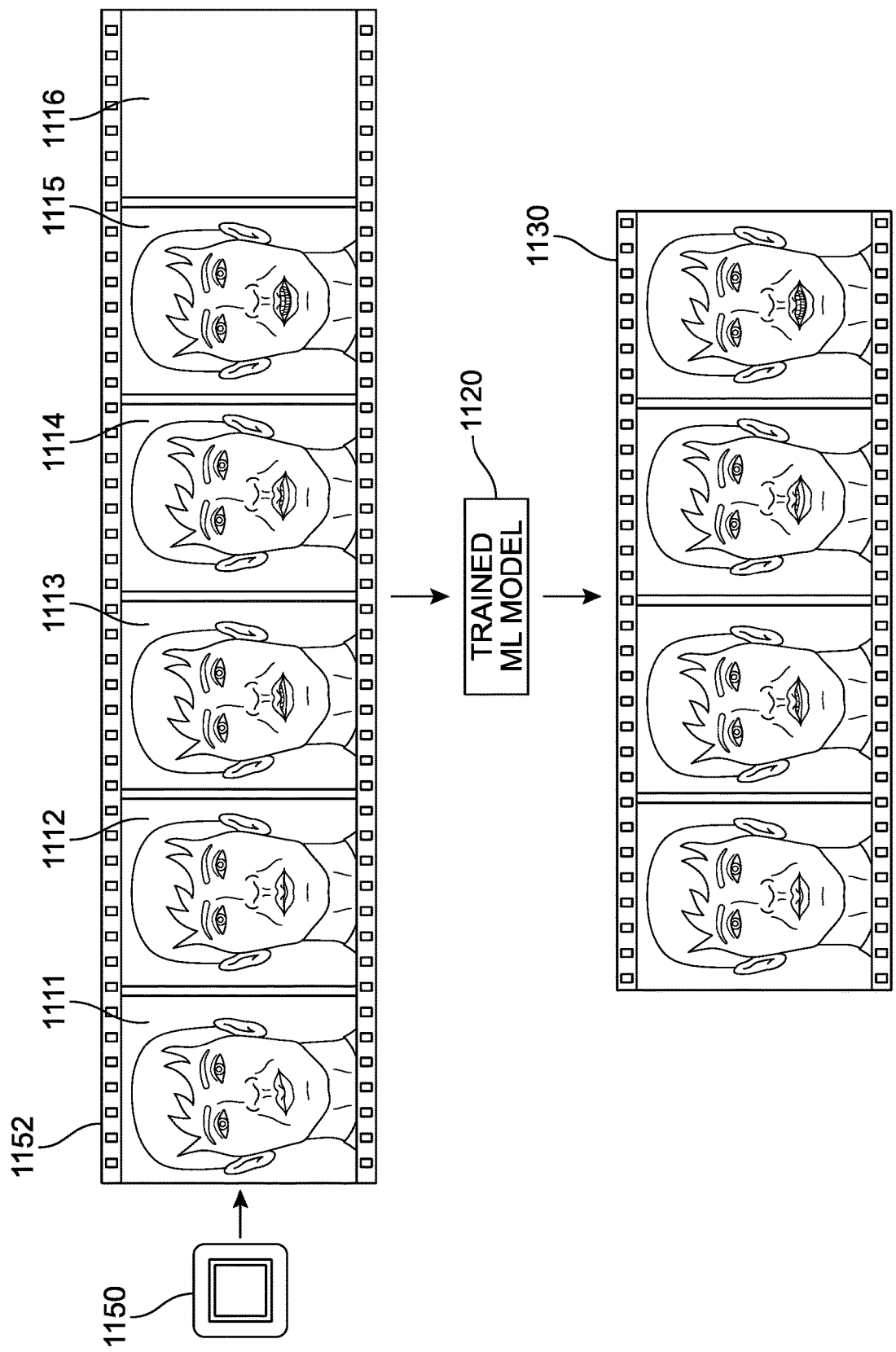
FIG. 11 illustrates a continuation of the example illustrated in FIG. 10, in which a third trained system applies an ML model generated based on the device-generated training data collected in FIG. 10 to detect an event based on video image frames from an imaging environmental sensor without the assistance of audio data.

Referring now to FIGS. 10 and 11, a second example application of the techniques described herein is illustrated. It should be understood that the following illustrations are for purposes of example only, and a wide variety of other implementations are possible that correspond to the disclosed techniques. The features and techniques illustrated and described in FIGS. 1-9 may be applied to the example in FIGS. 10 and 11, and features and techniques illustrated and described for the example in FIGS. 10 and 11 may be applied to the examples in FIGS. 1-9.

FIG. 10 illustrates an example of producing device-generated training data 1060 for a training event identified using a combined condition for event instances identified for environmental data of different environmental data types. In FIG. 10, a third training data collection device includes a seventh environmental sensor 1030 and an eighth environmental sensor 1050. During a first period of time twelve seconds in duration, audio data 1032 (which may be referred to as "seventh environmental data 1032" of a seventh environmental data type) is obtained based on measurements performed by the seventh environmental sensor 1030 at a first sampling rate (for example, 16000 samples per second), and video image frames 1052 (which may be referred to as "eighth environmental data 1052" of an eighth environmental data type) are obtained based on measurements performed by the eighth environmental sensor 1050 at a second frame rate (for example, 20 frames per second). Only a few examples of the video image frames 1052 are depicted in FIG. 10, including a first image 1011 for a time t=1, a second image 1012 for a time t=3, a third image 1013 for a time t=5, a fourth image 1014 for a time t=7, a fifth image 1015 for a time t=9, and a sixth image 1016 for a time t=11.

In this example, the seventh environmental data 1032 is automatically analyzed to identify instances of a fifth event type (when speaking is occurring), such as by configuring a third training event detector included in the third training data collection device to identify instances of the fifth event type based on at least environmental data of the seventh environmental data type. As illustrated by the graph 1040, the third training data collection device determines, based on the seventh environmental data 1032, that speaking is occurring during a second time period beginning at t=2.5 and ending at t=10 (which may be automatically labeled as, for example, "speaking"). Other labels may be generated based on the audio data 1032, such as, but not limited to a value indicating a detected volume of the speech. Additionally, the eighth environmental data 1052 is automatically analyzed to identify instances of a sixth event type (when a human face is visible), such as by configuring the third training event detector to also identify instances of the sixth event type based on at least environmental data of the eighth environmental data type. As illustrated by the graph 1020, the third training data collection device determines, based on the eighth environmental data 1052, that a human face is visible during a second time period beginning at t=4 and continuing to at least the end of the first time period at t=12 (which may be automatically labeled as, for example, "face detected").

In this example, the third training event detector is configured to determine that a training event has occurred for times when both the fifth event type is detected as occurring from the audio data 1032 (when the graph 1040 is high) and the sixth event type is detected as occurring from the video data 1052 (when the graph 1020 is high). As illustrated by the graph 1050, this results in the training event being detected for a third time period from t=4 (when graph 1020 goes high) to t=10 (when graph 1040 goes low). The third time period may be automatically labeled with labels such as "speaking," "face detected," and/or "speaking face." The third training event detector may be configured to require other combined conditions for determining a training event has occurred and a corresponding training event instance data item is generated. In some examples, Boolean operators such as AND, OR, NOT and XOR may be used to generate a combined condition. In some examples, conditions other than event detections may be specified, such as, but not limited to, an amount of time since a training event instance data item was generated, and/or a number and/or total size of training event instance data items generated in a period of time. Returning to the particular example illustrated in FIG. 10, the third training event detector produces device-generated training data based on a subportion 1060 of the video data 1052 corresponding to when the graph 1050 is high, including images 1013, 1014, and 1015. In some implementations, the video data 1052 may be automatically segmented to identify and select a subportion of the video data 1052 containing a human subject, a head, or a face. The device-generated training data is transmitted to a remote training system. Over time, the remote training system receives and accumulates more and more device-generated training data items from the third training data collection device and other training data collection devices, thereby increasing the amount and variety of training data available for ML model training, resulting in increased accuracy, effectiveness, and robustness of trained ML models.

FIG. 11 illustrates a continuation of the example illustrated in FIG. 10, in which a third trained system applies an ML model 1120 generated based on the device-generated training data 1060 collected in FIG. 10 to detect an event based on video image frames from an imaging environmental sensor 1150 without the assistance of audio data. In this example, a trained ML model 1120 has been generated, which is configured to be applied to video image frames and detect when speaking is occurring based on the video image frames without the assistance of audio data. Much as described for the video image frames 1052 in FIG. 10, video image frames 1152 (which may be referred to as "ninth environmental data 1152" of the eighth environmental data type) are obtained based on measurements performed by a ninth environmental sensor 1150 at a third frame rate (for example, 20 frames per second). Only a few examples of the video image frames 1152 are depicted in FIG. 11, including a seventh image 1111, an eighth image 1112, a ninth image 1113, a tenth image 1114, an eleventh image 1115, and a twelfth image 1116. By applying the trained ML model 1120 to the ninth environmental data 1152, video image frames 1130 are identified as depicting a speaking face.

Figure 12:
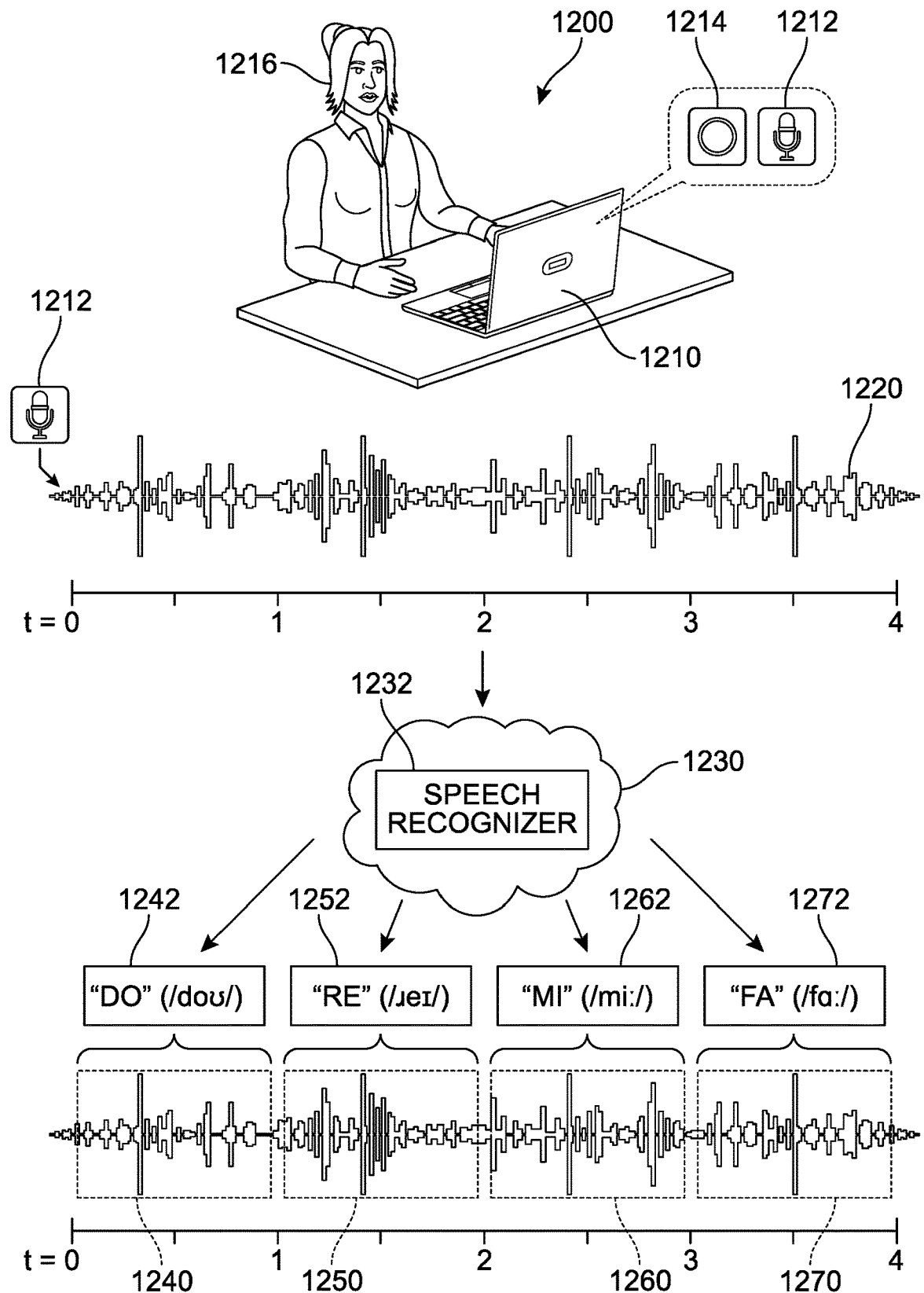
FIG. 12 illustrates a third example application of the disclosed techniques, in which a remote cloud-based speech recognizer is applied to identify and label events in audio data obtained at a fourth location.
Figure 13:
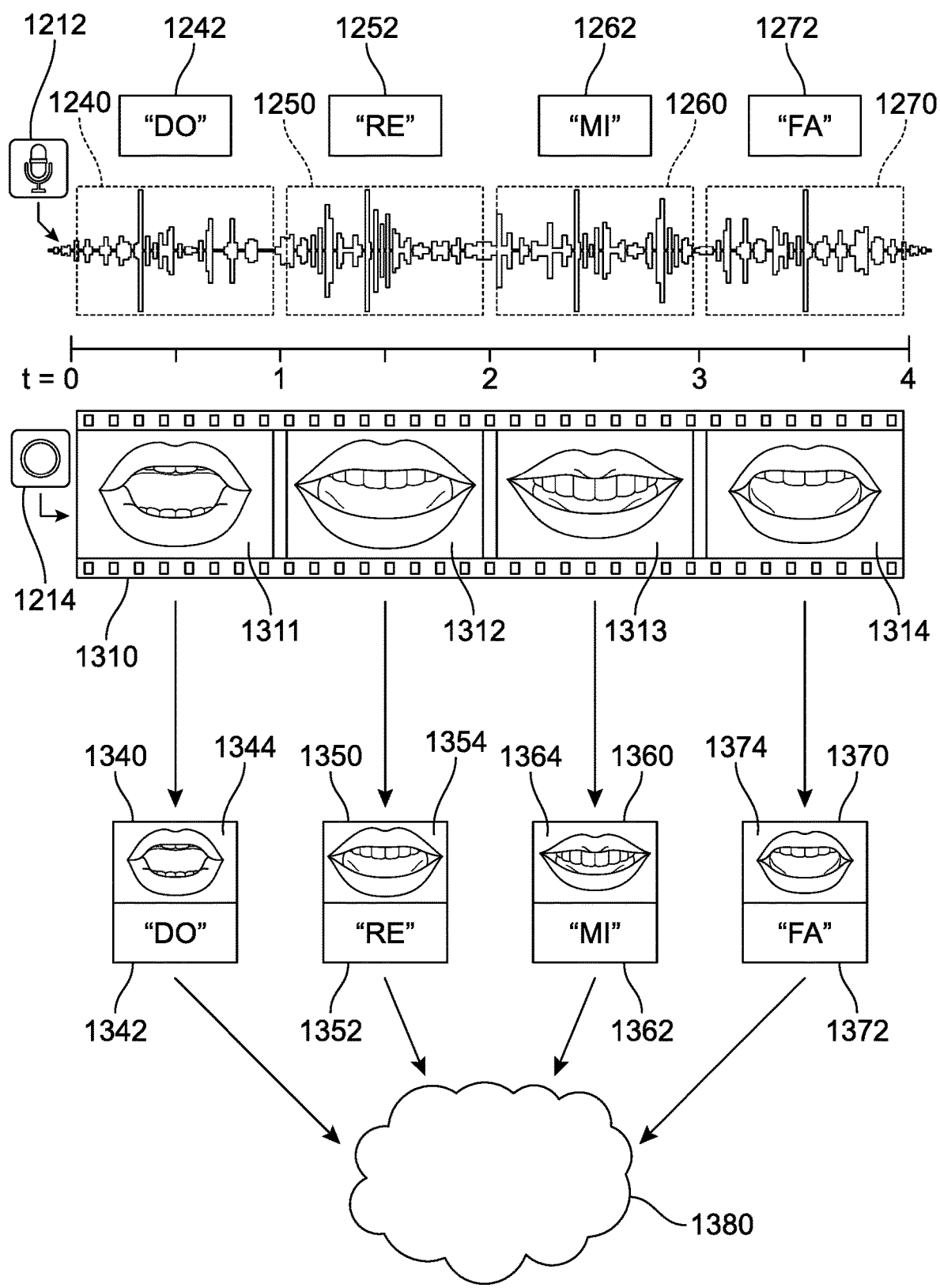
FIG. 13 illustrates a continuation of the example illustrated in FIG. 12, in which device-generated training data is produced for the event instance data items received from the speech recognizer in FIG. 12.

Referring now to FIGS. 12 and 13, a third example application of the techniques described herein is illustrated. It should be understood that the following illustrations are for purposes of example only, and a wide variety of other implementations are possible that correspond to the disclosed techniques. The features and techniques illustrated and described in FIGS. 1-11 may be applied to the example in FIGS. 12 and 13, and features and techniques illustrated and described for the example in FIGS. 12 and 13 may be applied to the examples in FIGS. 1-11.

FIG. 12 illustrates an example in which a remote cloud-based speech recognizer 1232 (which may be referred to as a "speech recognition module") is applied to identify and label events in audio data 1220 obtained at a fourth location 1100. In FIG. 12, a fourth training data collection device 1210 includes a tenth environmental sensor 1212 (configured to capture audio data) and an eleventh environmental sensor 1214 (configured to capture image data). During a fifth period of time four seconds in duration, audio data 1220 (which may be referred to as "tenth environmental data 1220" of a tenth environmental data type) is obtained based on measurements performed by the tenth environmental sensor 1212 at a fourth sampling rate (for example, 16000 samples per second). During the fifth period of time, a human subject 1216 is speaking, and the audio data 1220 has captured the utterances of the human subject 1216.

To take advantage of faster and/or more accurate speech recognition offered by a cloud-based remote system 1230, the fourth training data collection device 1210 transmits the audio data 1220 to a speech recognizer 1232 provided by the cloud-based remote system 1230. In some examples, the fourth training data collection device 1210 streams the audio data 1220 to the speech recognizer 1232 in real-time, and receives event instance data from the speech recognizer 1232 in real-time. In some examples, the speech recognizer 1232 may additionally be used for other purposes, such as speech-based interaction with a personal digital assistant implemented by the cloud-based remote system 1230. In some implementations, the fourth training data collection device 1210 includes a fourth target event detector configured to identify target events based on event instance data provided by the speech recognizer 1232. In this example, the speech recognizer 1232 identifies four utterances and provides respective event instance data items 1242, 1252, 1262, and 1272 with accompanying labels. A first event instance data item 1242 is labeled as corresponding to an utterance "DO" (/doʊ/) occurring during a sixth period of time 1240. A second event instance data item 1252 is labeled as corresponding to an utterance "RE" (/ɹeɪ/) occurring during a seventh period of time 1250. A third event instance data item 1262 is labeled as corresponding to an utterance "MI" (/miː/) occurring during an eighth period of time 1260. A fourth event instance data item 1272 is labeled as corresponding to an utterance "FA" (/fɑː/) occurring during a ninth period of time 1270.

FIG. 13 illustrates a continuation of the example illustrated in FIG. 12, in which device-generated training data is produced for the event instance data items received from the speech recognizer 1232 in FIG. 12. During the fifth period of time, video image frames 1310 (which may be referred to as "eleventh environmental data 1130" of an eleventh environmental data type) are obtained based on measurements performed by the eleventh environmental sensor 1214 at a fifth frame rate (for example, 20 frames per second). Only a few examples of the video image frames 1310 are depicted in FIG. 11, including a thirteenth image 1311 for a time t=0.5, a fourteenth image 1312 for a time t=1.5, a fifteenth image 1313 for a time t=2.5, and a sixteenth image 1314 for a time t=3.5. As illustrated in FIG. 13, the video image frames 1310 are focused on the lips and/or mouth of the human subject 1216.

The fourth training data collection device 1210 produces device-generated training data items 1340, 1350, 1360, and 1370 corresponding to respective event instance data items 1242, 1252, 1262, and 1272. A first device-generated training data item 1340 is generated based on a subportion of the video image frames 1310 corresponding to the sixth period of time 1240 for the event instance data items 1242. For example, the first device-generated training data item 1340 may include video image frames 1344 (including, for example, the thirteenth image 1311). The first device-generated training data item 1340 also includes a label 1342 identifying the detected utterance "DO." A similar approach is used to generate a second device-generated training data item 1350 (corresponding to the seventh period of time 1250, and including label 1352 ("RE") and video image frames 1354), a third device-generated training data item 1360 (corresponding to the eighth period of time 1260, and including label 1362 ("MI") and video image frames 1364), and a fourth device-generated training data item 1370 (corresponding to the ninth period of time 1270, and including label 1372 ("FA") and video image frames 1374). The fourth training data collection device 1210 transmits the device-generated training data items 1340, 1350, 1360, and 1370 to a remote training system 1380. The device-generated training data items 1340, 1350, 1360, and 1370 may be used along with other training data items to, for example, train an ML model to effectively perform lip-reading based on image data. Over time, the remote training system 1380 receives and accumulates more and more device-generated training data items from the fourth training data collection device 1210 and other training data collection devices, thereby increasing the amount and variety of training data available for ML model training, resulting in increased accuracy, effectiveness, and robustness of trained ML models.

Other related example applications could include collecting training data to estimate distance and/or bearing of a person based on audio data. In such applications, depth cameras or other image-based cameras could be used to reliably identify target event instances relating to distance and/or bearing, and these target event instances used to select and label corresponding audio data in device-generated training data items. By accumulating such training data, an ML model could be trained to automatically and effectively determine a distance and/or bearing of a person using audio data without assistance from image data.

Figure 14:
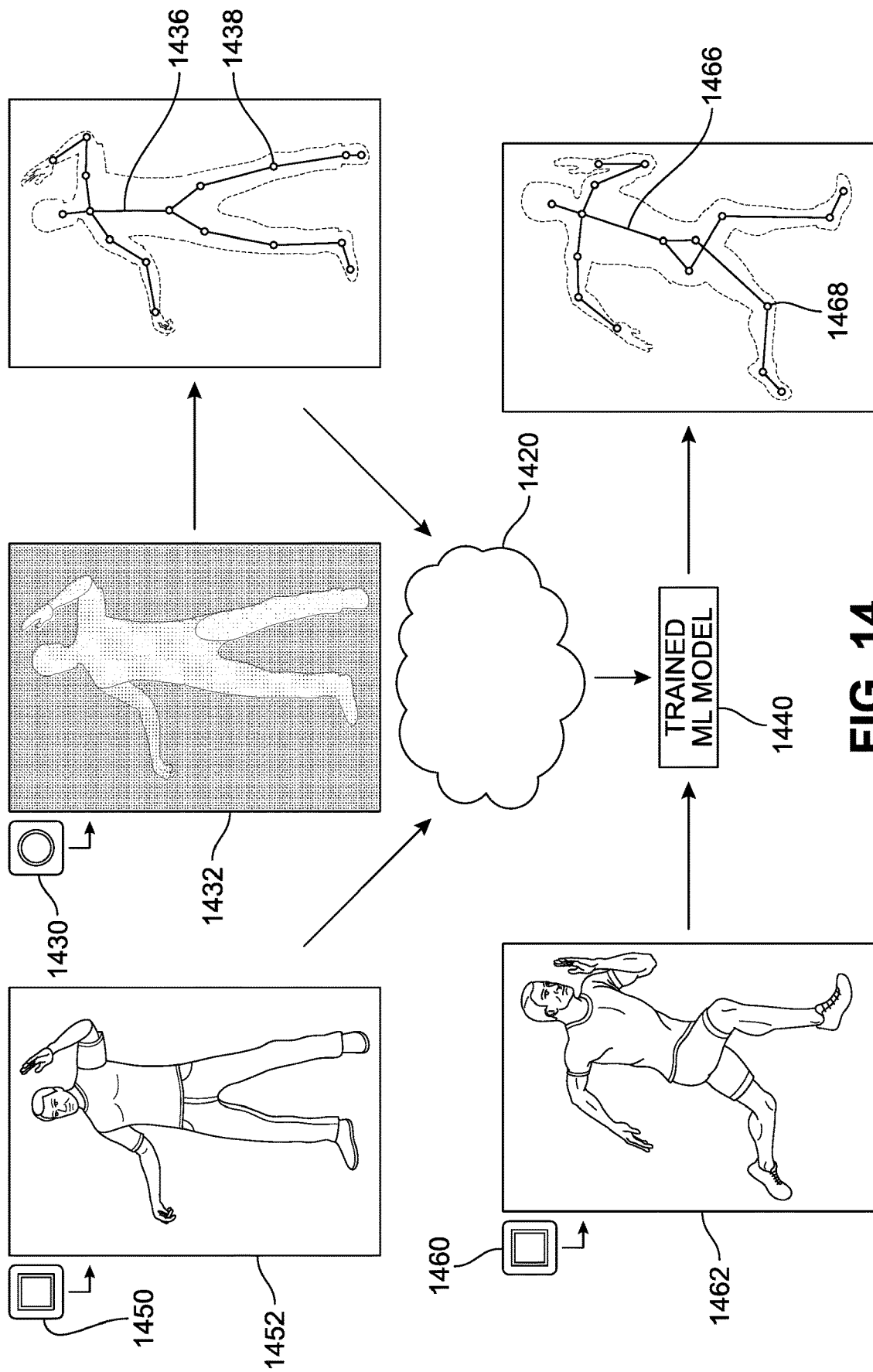
FIG. 14 illustrates a fourth example application of the disclosed techniques, in which three-dimensional position estimates generated from depth image data are used to label corresponding two-dimensional image data for training an ML model to generate similar three-dimensional position estimates from two-dimensional image data.

As described herein, in different implementations, training data can be automatically collected for a wide range of environmental data types and/or label types. FIG. 14 illustrates a fourth example application of the techniques described herein, in which three-dimensional position estimates generated from depth image data are used to label corresponding two-dimensional image data for training an ML model to generate similar three-dimensional position estimates from two-dimensional image data. It should be understood that FIG. 14 is for purposes of example only, and a wide variety of other implementations are possible that correspond to the disclosed techniques. The features and techniques illustrated and described in FIGS. 1-13 may be applied to the example in FIG. 14, and features and techniques illustrated and described for the example in FIG. 14 may be applied to the examples in FIGS. 1-13.

In FIG. 14, a fifth training data collection device includes a twelfth environmental sensor 1430 and a thirteenth environmental sensor 1450. At approximately a third time, depth image data 1432 (which may be referred to as "twelfth environmental data 1432" of a twelfth environmental data type) is obtained based on measurements performed by the twelfth environmental sensor 1430, and RGB image data 1452 (which may be referred to as "thirteenth environmental data 1452" of a thirteenth environmental data type) are obtained based on measurements performed by the thirteenth environmental sensor 1450. The fifth training data collection device includes a fifth training event detector (which may utilize services provided by a remote system, as illustrated in FIG. 12) configured generate a "skeleton" based on depth image data, such as a skeleton 1436 identifying multiple vertices 1438 for the twelfth environmental data 1432. The fifth training event detector generates training event instance data items labeled with vertices such as the vertices 1438. The vertices identified by training event instance data may then be translated from positions in a depth image (which may, for example, be three-dimensional positions) to corresponding positions in a corresponding two-dimensional RGB image, similar in respects to the translation described in FIG. 8. A device-generated training data item, including labels identifying the positions of the translated vertices, is produced using the RGB image data 1452 and transmitted to a remote training system 1420. Over time, the remote training system 1420 receives and accumulates more and more device-generated training data items from the fifth training data collection device and other training data collection devices, thereby increasing the amount and variety of training data available for ML model training, resulting in increased accuracy, effectiveness, and robustness of trained ML models.

FIG. 14 further illustrates a trained ML model 1440, trained using the device-generated training data item for the RGB image data 1452 and additional device-generated training data. As a result, the trained ML model 1440 is able to recognize human poses from low-cost RGB image sensor data, without requiring use of a high-cost depth imaging sensor. Demonstrating this, a fourth trained system including a fourteenth environmental sensor 1460, generates fourteenth environmental data 1462 of the thirteenth environmental data type (RGB image data) based on measurements performed by the fourteenth environmental sensor 1460. By applying the trained ML model 1440 to the fourteenth environmental data 1462, a skeleton 1466, including vertices 1468, is produced.

The detailed examples of systems, devices, and techniques described in connection with FIGS. 1-14 are presented herein for illustration of the disclosure and its benefits. Such examples of use should not be construed to be limitations on the logical process embodiments of the disclosure, nor should variations of user interface methods from those described herein be considered outside the scope of the present disclosure. In some embodiments, various features described in FIGS. 1-14 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 15:
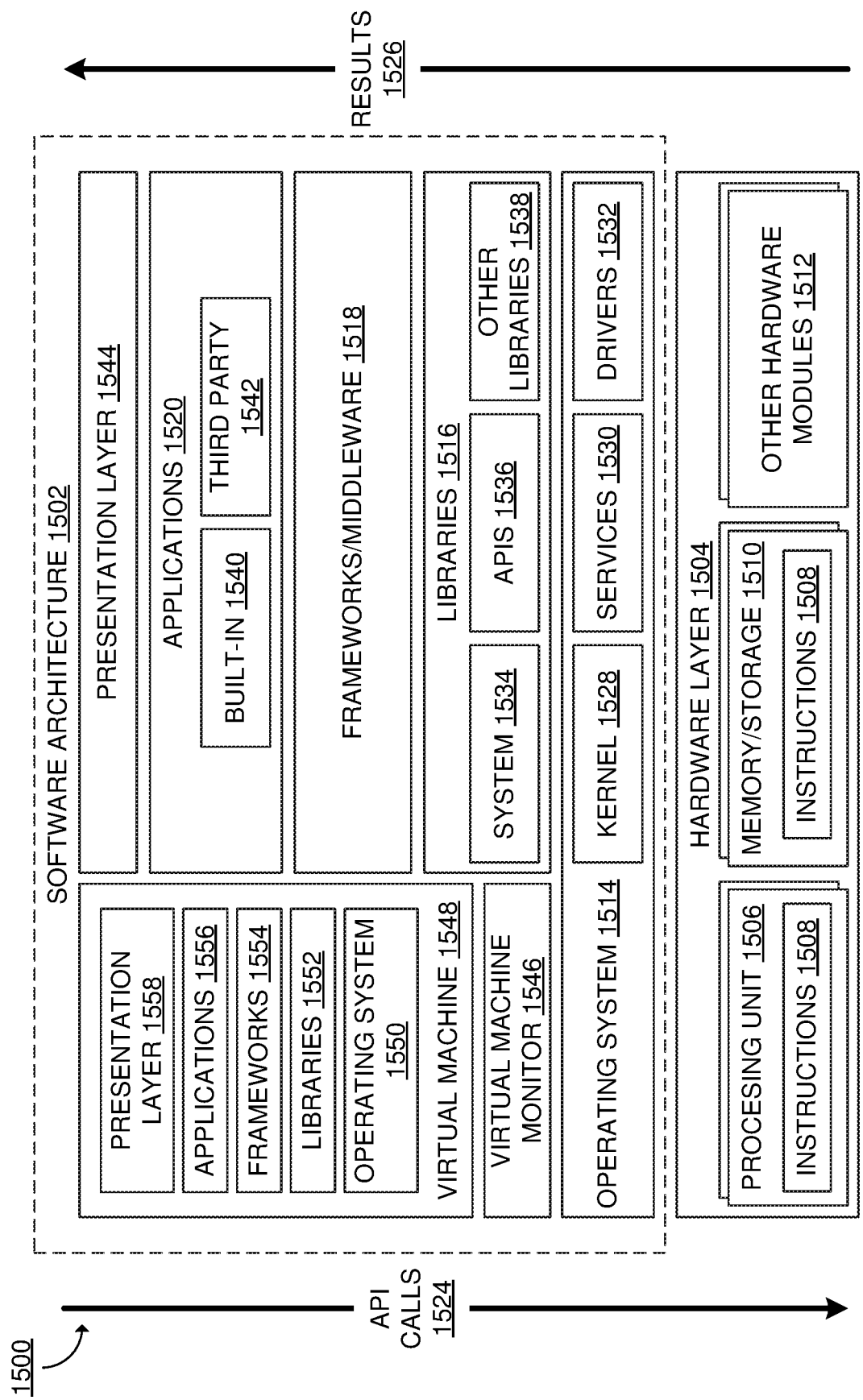
FIG. 15 is a block diagram illustrating an example software architecture, various portions of which may be used in conjunction with various hardware architectures, which may implement any of the described features.

FIG. 15 is a block diagram 1500 illustrating an example software architecture 1502, various portions of which may be used in conjunction with various hardware architectures herein described, which may implement any of the above-described features. FIG. 15 is a non-limiting example of a software architecture and it will be appreciated that many other architectures may be implemented to facilitate the functionality described herein. The software architecture 1502 may execute on hardware such as a machine 1600 of FIG. 16 that includes, among other things, processors 1610, memory 1630, and input/output (I/O) components 1650. A representative hardware layer 1504 is illustrated and can represent, for example, the machine 1600 of FIG. 16. The representative hardware layer 1504 includes a processing unit 1506 and associated executable instructions 1508. The executable instructions 1508 represent executable instructions of the software architecture 1502, including implementation of the methods, modules and so forth described herein. The hardware layer 1504 also includes a memory/storage 1510, which also includes the executable instructions 1508 and accompanying data. The hardware layer 1504 may also include other hardware modules 1512. Instructions 1508 held by processing unit 1508 may be portions of instructions 1508 held by the memory/storage 1510.

The example software architecture 1502 may be conceptualized as layers, each providing various functionality. For example, the software architecture 1502 may include layers and components such as an operating system (OS) 1514, libraries 1516, frameworks 1518, applications 1520, and a presentation layer 1544. Operationally, the applications 1520 and/or other components within the layers may invoke API calls 1524 to other layers and receive corresponding results 1526. The layers illustrated are representative in nature and other software architectures may include additional or different layers. For example, some mobile or special purpose operating systems may not provide the frameworks/middleware 1518.

The OS 1514 may manage hardware resources and provide common services. The OS 1514 may include, for example, a kernel 1528, services 1530, and drivers 1532. The kernel 1528 may act as an abstraction layer between the hardware layer 1504 and other software layers. For example, the kernel 1528 may be responsible for memory management, processor management (for example, scheduling), component management, networking, security settings, and so on. The services 1530 may provide other common services for the other software layers. The drivers 1532 may be responsible for controlling or interfacing with the underlying hardware layer 1504. For instance, the drivers 1532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1516 may provide a common infrastructure that may be used by the applications 1520 and/or other components and/or layers. The libraries 1516 typically provide functionality for use by other software modules to perform tasks, rather than rather than interacting directly with the OS 1514. The libraries 1516 may include system libraries 1534 (for example, C standard library) that may provide functions such as memory allocation, string manipulation, file operations. In addition, the libraries 1516 may include API libraries 1536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1516 may also include a wide variety of other libraries 1538 to provide many functions for applications 1520 and other software modules.

The frameworks 1518 (also sometimes referred to as middleware) provide a higher-level common infrastructure that may be used by the applications 1520 and/or other software modules. For example, the frameworks 1518 may provide various graphic user interface (GUI) functions, high-level resource management, or high-level location services. The frameworks 1518 may provide a broad spectrum of other APIs for applications 1520 and/or other software modules.

The applications 1520 include built-in applications 1540 and/or third-party applications 1542. Examples of built-in applications 1540 may include, but are not limited to, a contacts application, a browser application, a location application, a media application, a messaging application, and/or a game application. Third-party applications 1542 may include any applications developed by an entity other than the vendor of the particular platform. The applications 1520 may use functions available via OS 1514, libraries 1516, frameworks 1518, and presentation layer 1544 to create user interfaces to interact with users.

Some software architectures use virtual machines, as illustrated by a virtual machine 1548. The virtual machine 1548 provides an execution environment where applications/modules can execute as if they were executing on a hardware machine (such as the machine 1600 of FIG. 16, for example). The virtual machine 1548 may be hosted by a host OS (for example, OS 1514) or hypervisor, and may have a virtual machine monitor 1546 which manages operation of the virtual machine 1548 and interoperation with the host operating system. A software architecture, which may be different from software architecture 1502 outside of the virtual machine, executes within the virtual machine 1548 such as an OS 1550, libraries 1552, frameworks 1554, applications 1556, and/or a presentation layer 1558.

Figure 16:
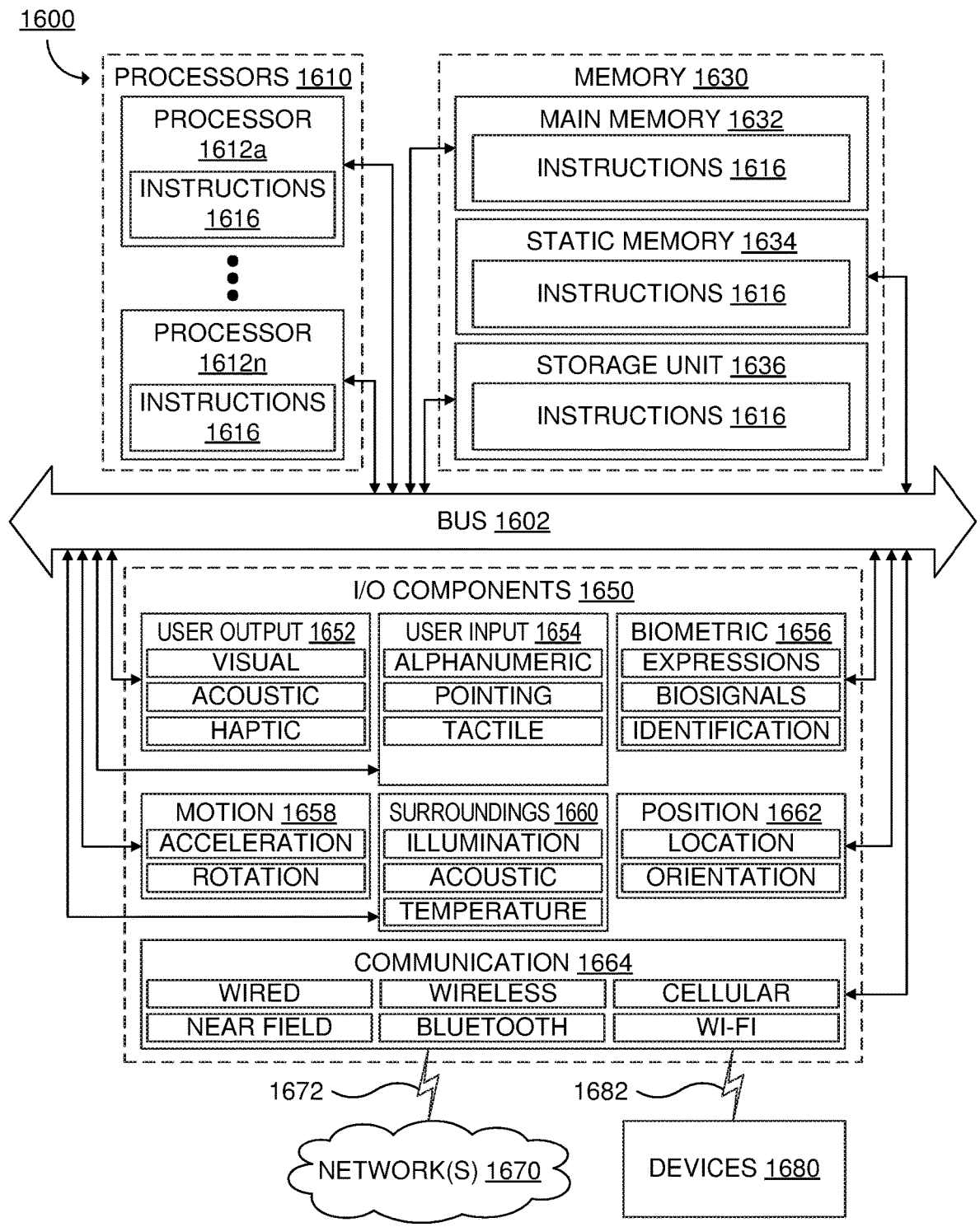
FIG. 16 is a block diagram illustrating components of an example machine configured to read instructions from a machine-readable medium and perform any of the described features.

FIG. 16 is a block diagram illustrating components of an example machine 1600 configured to read instructions from a machine-readable medium (for example, a machine-readable storage medium) and perform any of the features described herein. The example machine 1600 is in a form of a computer system, within which instructions 1616 (for example, in the form of software components) for causing the machine 1600 to perform any of the features described herein may be executed. As such, the instructions 1616 may be used to implement modules or components described herein. The instructions 1616 cause unprogrammed and/or unconfigured machine 1600 to operate as a particular machine configured to carry out the described features. The machine 1600 may be configured to operate as a standalone device or may be coupled (for example, networked) to other machines. In a networked deployment, the machine 1600 may operate in the capacity of a server machine or a client machine in a server-client network environment, or as a node in a peer-to-peer or distributed network environment. Machine 1600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1600 is illustrated, the term "machine" include a collection of machines that individually or jointly execute the instructions 1616.

The machine 1600 may include processors 1610, memory 1630, and I/O components 1650, which may be communicatively coupled via, for example, a bus 1602. The bus 1602 may include multiple buses coupling various elements of machine 1600 via various bus technologies and protocols. In an example, the processors 1610 (including, for example, a central processing unit (CPU), a graphics processing unit (GPU), a digital signal processor (DSP), an ASIC, or a suitable combination thereof) may include one or more processors 1612a to 1612n that may execute the instructions 1616 and process data. In some examples, one or more processors 1610 may execute instructions provided or identified by one or more other processors 1610. The term "processor" includes a multi-core processor including cores that may execute instructions contemporaneously. Although FIG. 16 shows multiple processors, the machine 1600 may include a single processor with a single core, a single processor with multiple cores (for example, a multi-core processor), multiple processors each with a single core, multiple processors each with multiple cores, or any combination thereof. In some examples, the machine 1600 may include multiple processors distributed among multiple machines.

The memory/storage 1630 may include a main memory 1632, a static memory 1634, or other memory, and a storage unit 1636, both accessible to the processors 1610 such as via the bus 1602. The storage unit 1636 and memory 1632, 1634 store instructions 1616 embodying any one or more of the functions described herein. The memory/storage 1630 may also store temporary, intermediate, and/or long-term data for processors 1610. The instructions 1616 may also reside, completely or partially, within the memory 1632, 1634, within the storage unit 1636, within at least one of the processors 1610 (for example, within a command buffer or cache memory), within memory at least one of I/O components 1650, or any suitable combination thereof, during execution thereof. Accordingly, the memory 1632, 1634, the storage unit 1636, memory in processors 1610, and memory in I/O components 1650 are examples of machine-readable media.

As used herein, "machine-readable medium" refers to a device able to temporarily or permanently store instructions and data that cause machine 1600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1616) for execution by a machine 1600 such that the instructions, when executed by one or more processors 1610 of the machine 1600, cause the machine 1600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1650 may include a wide variety of hardware components adapted to receive input, provide output, produce output, transmit information, exchange information, capture measurements, and so on. The specific I/O components 1650 included in a particular machine will depend on the type and/or function of the machine. For example, mobile devices such as mobile phones may include a touch input device, whereas a headless server or IoT device may not include such a touch input device. The particular examples of I/O components illustrated in FIG. 16 are in no way limiting, and other types of components may be included in machine 1600. The grouping of I/O components 1650 are merely for simplifying this discussion, and the grouping is in no way limiting. In various examples, the I/O components 1650 may include user output components 1652 and user input components 1654. User output components 1652 may include, for example, display components for displaying information (for example, a liquid crystal display (LCD) or a projector), acoustic components (for example, speakers), haptic components (for example, a vibratory motor or force-feedback device), and/or other signal generators. User input components 1654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1650 may include biometric components 1656, motion components 1658, environmental components 1660, and/or position components 1662, among a wide array of other environmental sensor components. The biometric components 1656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The motion components 1658 may include, for example, acceleration sensors (for example, an accelerometer) and rotation sensors (for example, a gyroscope). The environmental components 1660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1662 may include, for example, location sensors (for example, a Global Position System (GPS) receiver), altitude sensors (for example, an air pressure sensor from which altitude may be derived), and/or orientation sensors (for example, magnetometers).

The I/O components 1650 may include communication components 1664, implementing a wide variety of technologies operable to couple the machine 1600 to network(s) 1670 and/or device(s) 1680 via respective communicative couplings 1672 and 1682. The communication components 1664 may include one or more network interface components or other suitable devices to interface with the network(s) 1670. The communication components 1664 may include, for example, components adapted to provide wired communication, wireless communication, cellular communication, Near Field Communication (NFC), Bluetooth communication, Wi-Fi, and/or communication via other modalities. The device(s) 1680 may include other machines or various peripheral devices (for example, coupled via USB).

In some examples, the communication components 1664 may detect identifiers or include components adapted to detect identifiers. For example, the communication components 1664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A training data collection device for automatically generating machine learning training data, the training data collection device comprising:
    a first environmental sensor; and
    a first machine readable medium including first instructions which, when executed by the training data collection device, cause the training data collection device to:
        receive first training event detection data for identifying events of a first event type based on at least environmental data of a first environmental data type;
        based on the received first training event detection data, configure a training event detector included in the device to identify events of the first event type based on at least environmental data of the first environmental data type;
        obtain first environmental data of the first environmental data type based at least on a first measurement performed by the first environmental sensor at a first time;
        obtain second environmental data of a second environmental data type based on at least one or more measurements performed by a second environmental sensor, wherein the second environmental data type is different than the first environmental data type;
        automatically determine, based on at least applying the configured training event detector to the first environmental data, that a first event occurred at about the first time;
        automatically select a first subportion of the second environmental data based on at least the first subportion of the second environmental data corresponding to the first measurement performed by the first environmental sensor; and
        generate training data based on at least the selected first subportion of the second environmental data.

2. A training system for automatically collecting machine learning training data, the training system comprising:
    the training data collection device of claim 1, wherein the first instructions further cause the training data collection device to transmit the training data to a remote computer server; and
    a second machine readable medium including second instructions which, when executed by the training system, cause the training system to:
        receive the transmitted training data, and
        train, using at least the received training data, a first machine learning model configured to be applied to environmental data of the second environmental data type to determine whether an event of the first event type has occurred.

3. The training system of claim 2, further comprising a trained system that includes a third environmental sensor and a third machine readable medium including instructions which, when executed by the trained system, cause the trained system to:
    obtain third environmental data of the second environmental data type based at least on measurements performed by the third environmental sensor; and
    automatically determine, by applying the first machine learning model to the third environmental data, that an event of the first event type has occurred.

4. The training data collection device of claim 1, further comprising the second environmental sensor, wherein the second environmental sensor is different than the first environmental sensor.

5. The training data collection device of claim 1, wherein the training event detection data includes values for a machine learning model configured to be applied to data of the first environmental data type to detect whether an event of the first event type has occurred.

6. The training data collection device of claim 1, wherein:
    the first instructions further cause the training data collection device to automatically determine, by applying the training event detector to the first environmental data, a region of interest for the first event; and
    further base the automatic selection of the first subportion of the second environmental data on an identification of the first subportion of the second environmental data as corresponding to measurements performed by the second environmental sensor for the determined region of interest.

7. The training data collection device of claim 6, wherein:
    the first environmental sensor includes a first optical imaging sensor;
    the first environmental data includes a first two-dimensional image corresponding to measurements performed by the first optical imaging sensor;
    the training data collection device includes the second environmental sensor;
    the second environmental sensor includes a second optical imaging sensor;
    the second environmental data includes a second two-dimensional image corresponding to measurements performed by the second optical imaging sensor;
    the determined region of interest is a subportion of the first image; and
    the first instructions further cause the training data collection device to translate positions for the determined region of interest to corresponding positions in the second image to identify a subportion of the second image that corresponds to the determined region of interest.

8. The training data collection device of claim 2, wherein the first instructions further cause the training data collection device to:
    automatically generate a label for the first event, by applying the training event detector to the first environmental data; and
    include the label in the training data transmitted to the remote computer server.

9. The training data collection device of claim 1, wherein the first instructions further cause the training data collection device to:

further configure the training event detector to identify events of a second event type based at least on environmental data of a third environmental data type;

obtaining third environmental data of the third environmental data type based on at least a second measurement performed by a third environmental sensor; and further base the determination that the first event occurred on applying the configured training event detector to the third environmental data.

10. A method of automated generation of machine learning training data, the method comprising:

receiving, at a first computing device including a first environmental sensor, first training event detection data for identifying events of a first event type based on at least environmental data of a first environmental data type;

based on the received first training event detection data, configuring a training event detector included in the first computing device to identify events of the first event type based on at least environmental data of the first environmental data type;

obtaining first environmental data of the first environmental data type based at least on a first measurement performed by the first environmental sensor at a first location at a first time;

obtaining second environmental data of a second environmental data type based on at least one or more measurements performed by a second environmental sensor at the first location, wherein the second environmental data type is different than the first environmental data type;

automatically determining, based on at least applying the configured training event detector to the first environmental data, that a first event occurred at about the first time;

automatically selecting a first subportion of the second environmental data based on at least the first subportion of the second environmental data corresponding to the first measurement performed by the first environmental sensor;

generating training data based on at least the selected first subportion of the second environmental data.

11. The method of claim 10, further comprising training, using at least the received training data, a first machine learning model configured to be applied to environmental data of the second environmental data type to determine whether an event of the first event type has occurred.

12. The method of claim 11, further comprising:

obtaining third environmental data of the second environmental data type based at least on measurements performed by a third environmental sensor at a second location different than the first location; and automatically determining, by applying the first machine learning model to the third environmental data, that an event of the first event type has occurred.

13. The method of claim 10, wherein:

the second environmental sensor is included in the first computing device and is different than the first environmental sensor; and the automatic selection of the first subportion of the second environmental data is performed at the first computing device.

14. The method of claim 10, wherein the training event detection data includes values for a machine learning model configured to be applied to data of the first environmental data type to detect whether an event of the first event type has occurred.

15. The method of claim 10, further comprising:

automatically determining, by applying the training event detector to the first environmental data, a region of interest for the first event, wherein the automatic selection of the first subportion of the second environmental data is further based on an identification of the first subportion of the second environmental data as corresponding to measurements performed by the second environmental sensor for the determined region of interest.

16. The method of claim 15, wherein:

the first environmental sensor includes a first optical imaging sensor;

the first environmental data includes a first two-dimensional image corresponding to measurements performed by the first optical imaging sensor;

the second environmental sensor includes a second optical imaging sensor;

the second environmental data includes a second two-dimensional image corresponding to measurements performed by the second optical imaging sensor;

the determined region of interest is a subportion of the first image; and the method further comprises translating positions for the determined region of interest to corresponding positions in the second image to identify a subportion of the second image that corresponds to the determined region of interest.

17. The method of claim 10, further comprising:

automatically generating a label for the first event, by applying the training event detector to the first environmental data; and including the label in the training data transmitted to the remote computer server.

18. The method of claim 10, further comprising:

further configuring the training event detector to identify events of a second event type based at least on environmental data of a third environmental data type; and obtaining third environmental data of the third environmental data type based on at least a second measurement performed by a third environmental sensor at the first location, wherein the determination that the first event occurred is further based on applying the configured training event detector to the third environmental data.

19. A nontransitory machine readable medium including program instructions which, when executed by a machine, cause the machine to perform the method of claim 10.

* * * * *